(12) United States Patent
Snook

(10) Patent No.: US 10,507,983 B1
(45) Date of Patent: Dec. 17, 2019

(54) BAGGAGE CART HANDLING SYSTEM

(71) Applicant: American Airlines, Inc., DFW Airport, TX (US)

(72) Inventor: Jonathan Damon Snook, Southlake, TX (US)

(73) Assignee: American Airlines, Inc., DFW Airport, TX (US)

( * ) Notice: Subject to any disclaimer, the term of this patent is extended or adjusted under 35 U.S.C. 154(b) by 83 days.

(21) Appl. No.: 15/645,534

(22) Filed: Jul. 10, 2017

Related U.S. Application Data

(62) Division of application No. 14/019,140, filed on Sep. 5, 2013, now Pat. No. 9,701,483, which is a division
(Continued)

(51) Int. Cl.
*B65G 41/00* (2006.01)
*B65G 11/06* (2006.01)
*B60P 1/38* (2006.01)

(52) U.S. Cl.
CPC ............ *B65G 41/008* (2013.01); *B65G 11/06* (2013.01); *B60P 1/38* (2013.01); *B65G 2814/0398* (2013.01)

(58) Field of Classification Search
CPC .......... B64F 1/368; B64F 1/32; B65G 11/063; B65G 11/06; B65G 11/12; B65G 11/123;
(Continued)

(56) References Cited

U.S. PATENT DOCUMENTS

| 701,459 A | * | 6/1902 | Aston ................... B65G 21/18 193/12 |
| 958,044 A | | 5/1910 | Thomas |

(Continued)

FOREIGN PATENT DOCUMENTS

GB  2470557 A  12/2010

OTHER PUBLICATIONS

Spiral Chutes, product web page; http://www.portec.com/products/spiral-chutes; visited/captured May 19, 2010.
(Continued)

*Primary Examiner* — Glenn F Myers
(74) *Attorney, Agent, or Firm* — Pramudji Law Group PLLC; Ari Pramudji

(57) ABSTRACT

A system for holding one or more bags. The system includes a cart, a first chute disposed on the cart, and a second chute also disposed on the cart. The first chute includes a first edging along each side of the first chute. The second chute includes a second edging along each side of the second chute. The second chute is intertwined with the first chute. The system may further include a third chute and a fourth chute disposed on the cart. The third chute may include a third edging along each side of the third chute, and the fourth chute may include a fourth edging along each side of the fourth chute. The top and bottom of the first chute and the top and bottom of the second chute are positioned on opposite ends of the cart at about 180 degrees apart, while the top and bottom of the third chute and the top and bottom of the fourth chute are positioned on opposite ends of the cart at about 180 degrees apart.

14 Claims, 14 Drawing Sheets

Related U.S. Application Data of application No. 13/098,125, filed on Apr. 29, 2011, now Pat. No. 8,556,084.

(58) Field of Classification Search
CPC .. B65G 21/18; B65G 2207/24; B65G 41/008; B65G 41/002; B65G 41/005; B65G 67/08; B65G 67/00; B65G 2201/0264; B65G 2814/0398; B64D 9/00; B64D 9/003; B64D 2009/006; B60P 1/38

See application file for complete search history.

(56) References Cited

U.S. PATENT DOCUMENTS

| | | | |
|---|---|---|---|
| 3,356,236 | A | 12/1967 | Shaw et al. |
| 3,695,462 | A | 10/1972 | Sullivan |
| 3,837,452 | A | 9/1974 | Schuricht |
| 4,295,559 | A | 10/1981 | Neal et al. |
| 4,343,587 | A | 8/1982 | Aidlin et al. |
| 4,517,698 | A * | 5/1985 | Lamp'l ............ B65G 69/30 14/69.5 |
| 4,925,002 | A | 9/1990 | Williams |
| 5,249,842 | A | 10/1993 | Doering et al. |
| 5,603,598 | A | 2/1997 | Hasegawa et al. |
| 5,609,223 | A | 3/1997 | Iizaka et al. |
| 6,006,888 | A | 12/1999 | Winchester |
| 6,162,004 | A | 12/2000 | Hanakawa |
| 6,371,275 | B1 | 4/2002 | Terrell et al. |
| 6,523,677 | B1 | 2/2003 | DeGennaro et al. |
| 6,561,339 | B1 | 5/2003 | Olson et al. |
| 6,659,704 | B2 | 12/2003 | Fukuhara et al. |
| 7,030,760 | B1 | 4/2006 | Brown |
| 7,753,191 | B2 | 7/2010 | Lykkegaard et al. |
| 8,025,155 | B2 | 9/2011 | Pippin |
| 8,302,764 | B2 | 11/2012 | Johnson |
| 8,509,945 | B1 | 8/2013 | Snaith et al. |
| 9,676,561 | B1 | 6/2017 | Snook |
| 2001/0020566 | A1 | 9/2001 | Kalm et al. |
| 2002/0074456 | A1 | 6/2002 | Marrero |
| 2004/0033126 | A1 | 2/2004 | Thogersen |
| 2008/0232941 | A1 | 9/2008 | Van Den et al. |
| 2009/0177316 | A1 | 7/2009 | Schedel et al. |
| 2010/0096243 | A1 | 4/2010 | Balk |
| 2010/0300836 | A1 | 12/2010 | Fourney et al. |
| 2011/0259713 | A1 | 10/2011 | Glass et al. |

OTHER PUBLICATIONS

Bagload, Integrated Robot Loading brochure; Vanderlande Industries; Sep. 2009.

RampMate, product brochure; Crisplant a/s; May 2009.

Chutes & Glacis, Baggage Handling Solutions brochure; Logan Teleflex, Aug. 20, 2008.

* cited by examiner

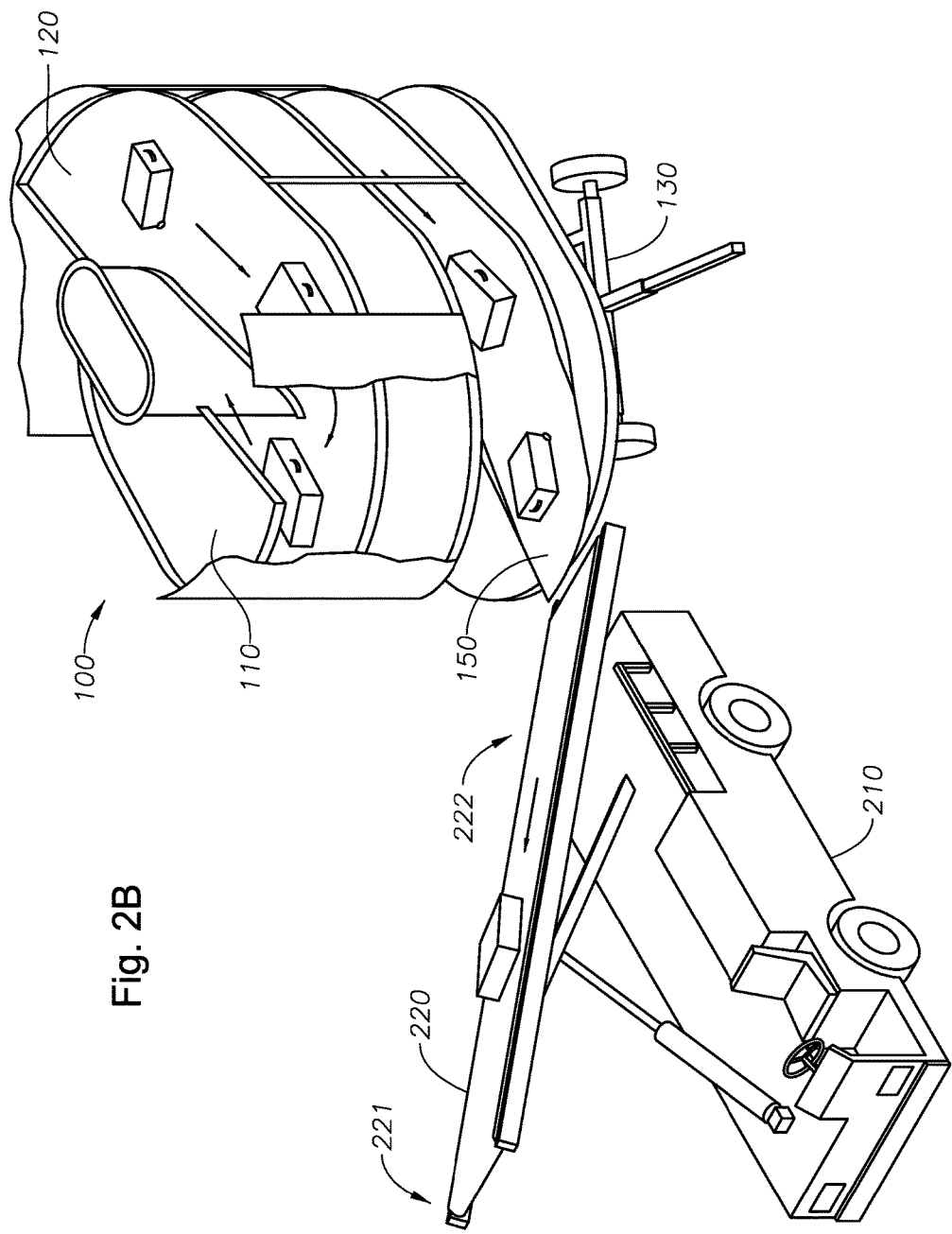

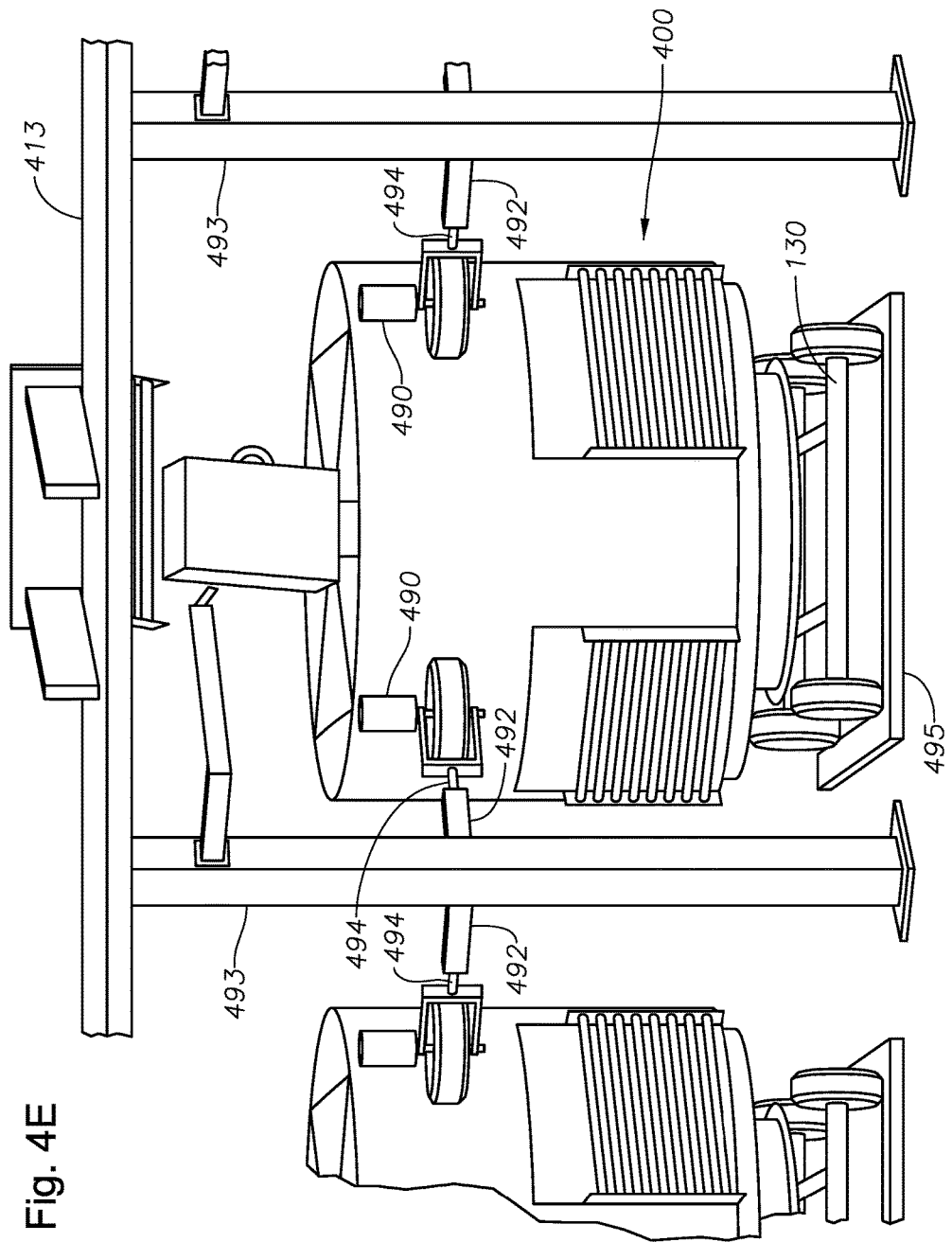

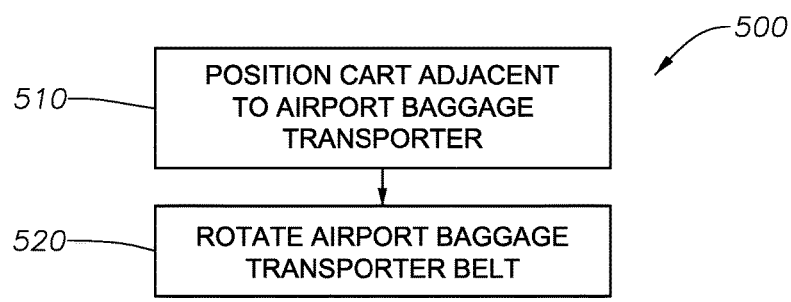
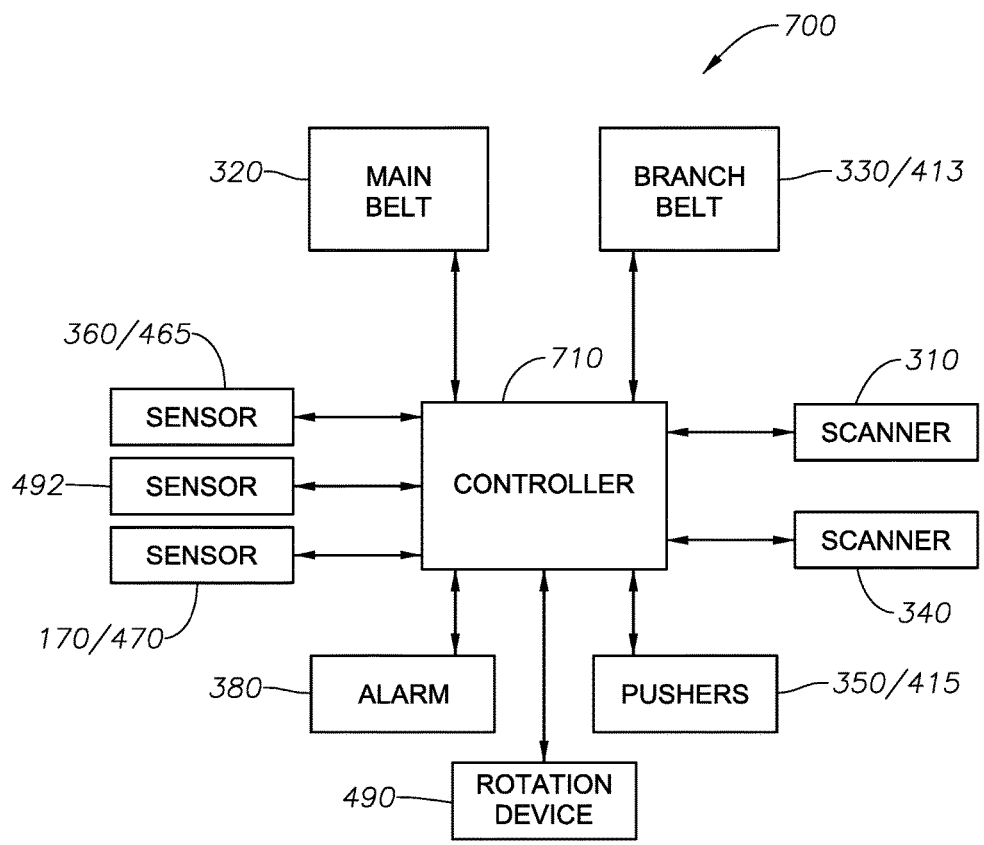

BAGGAGE CART HANDLING SYSTEM

RELATED APPLICATIONS

This application is a divisional of U.S. patent application Ser. No. 14/019,140, filed Sep. 5, 2013 and now U.S. Pat. No. 9,701,483; which is a divisional of U.S. patent application Ser. No. 13/098,125, filed Apr. 29, 2011, titled BAGGAGE CART HANDLING SYSTEM, now U.S. Pat. No. 8,556,084 and the entire disclosure of which is incorporated herein by reference.

BACKGROUND

Field of the Invention

Implementations of various technologies described herein generally relate to a cart that may be used to hold and transport baggage. More specifically, various technologies described herein generally relate to a baggage cart used for transporting baggage throughout an airport's baggage network.

DESCRIPTION OF THE RELATED ART

The following description and examples do not constitute an admission as prior art by virtue of their inclusion within this section. Airport baggage systems or networks are designed to transport baggage from a traveler's airport of departure to the traveler's destination airport. When a traveler checks his baggage with an airline, the baggage is sent to a complex baggage network and is ultimately placed on the traveler's aircraft. Upon arriving at the traveler's destination, the baggage is then transported from the aircraft to the destination airport's baggage claim area.

In order to place the checked baggage on the traveler's aircraft, the current airport baggage system sends the baggage to an internal baggage claim area where airport employees read tags that are placed on each piece of baggage to determine the flight information that corresponds to each piece of baggage. After determining the flight information, the airport employees manually lift each piece of baggage from a conveyor belt at or near the ground and place each piece of baggage in a conventional baggage cart. Typically, there are a number of conventional baggage carts that are located in the internal baggage claim area and each conventional baggage cart is assigned to a particular aircraft. The airport employees place each piece of baggage into the conventional baggage cart that corresponds to the flight information on the piece of baggage.

Each conventional baggage cart is then transported to its corresponding aircraft, where the airport employees manually lift each piece of baggage from the conventional baggage cart and place each piece of baggage on a mobile conveyor belt (i.e., mobile bag loader). The mobile bag loader then transports each piece of baggage from the ground level to the aircraft so that each piece of baggage may be placed on the aircraft. A similar process, but in the reverse order, is used to transport each piece of baggage from the aircraft to the baggage claim area at the traveler's destination. The manual lifting of each piece of baggage involved in the current airport baggage system often creates inefficient use of airport employees' energy. Further, depending on airport employees to determine which piece of baggage corresponds to which conventional baggage cart increases the likelihood of human error in making such determination.

SUMMARY

Described herein are implementations of various technologies of a baggage cart used to hold baggage. In one implementation, the baggage cart may include a cart, a first chute disposed on the cart, and a second chute also disposed on the cart. The first chute may include a first edging along each side of the first chute. The second chute may include a second edging along each side of the second chute. The second chute may be intertwined with the first chute.

In another implementation, the baggage cart may include a third chute and a fourth chute on the cart. The third chute may include a third edging along each side of the third chute, and the fourth chute may include a fourth edging along each side of the fourth chute. The top and bottom of the first chute and the top and bottom of the second chute are positioned on opposite ends of the cart at about 180 degrees apart, while the top and bottom of the third chute and the top and bottom of the fourth chute are positioned on opposite ends of the cart at about 180 degrees apart.

Described herein are also implementations of various technologies of a baggage cart handling system. In one implementation, the baggage handling system may include a main conveyor belt, one or more branch conveyor belts, and one or more baggage carts disposed underneath the main conveyor belt, the branch conveyor belt or combinations thereof. The main conveyor belt and the branch conveyor belts may be configured to transport one or more bags. Each baggage cart may have at least two intertwined chutes for receiving the bags from the main conveyor belt, the branch conveyor belts, or combinations thereof.

Described herein are also various implementations of a method for unloading one or more bags. In one implementation, the method may include positioning a back end of a conveyor belt on a mobile bag loader adjacent to and under a first chute of a baggage cart having at least two intertwined chutes. The method may then include folding down a ramp portion of the first chute toward the back end and rotating the conveyor belt.

Described herein are also various implementations of a method for loading one or more bags. In one implementation, the method may include positioning a front end of a conveyor belt on a mobile bag loader adjacent to and above a first chute of a baggage cart having at least two intertwined chutes. The method may then include placing the bags on the conveyor belt and rotating the conveyor belt.

Described herein are also various implementations of a method for managing a chute of a baggage cart for holding one or more bags. In one implementation, the method may include sending a command to an optical sensor to project a light beam at the chute. The method may then include determining that the chute is full if the optical sensor does not receive a reflected light beam within a first predetermined amount of time.

In another implementation, the method for managing a chute of a baggage cart may include sending a command to an ultrasonic sensor to send one or more sound waves to a chute of the baggage cart. The method may then include determining that the chute is full if the ultrasonic sensor does not receive one or more reflected sound waves within a predetermined amount of time.

In yet another implementation, the method for managing a chute of a baggage cart may include sending a command to a vision sensor to acquire an image of the chute. The method may then include determining that the chute is full if the image does not match a reference image that corresponds to an empty chute.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

FIG. 2B illustrates a mobile bag loader unloading baggage from a double helix baggage cart in accordance with implementations of various technologies described herein.

FIG. 4E illustrates a side view of a branch belt in an airport baggage system using a plurality of quadruple helix baggage carts in accordance with implementations of various technologies described herein.

FIG. 5 illustrates a flow diagram of a method for transporting baggage using a double helix baggage cart in accordance with one or more implementations of various techniques described herein.

FIG. 7 illustrates a computer network into which implementations of various technologies described herein may be implemented.

DETAILED DESCRIPTION

Figure 1A:
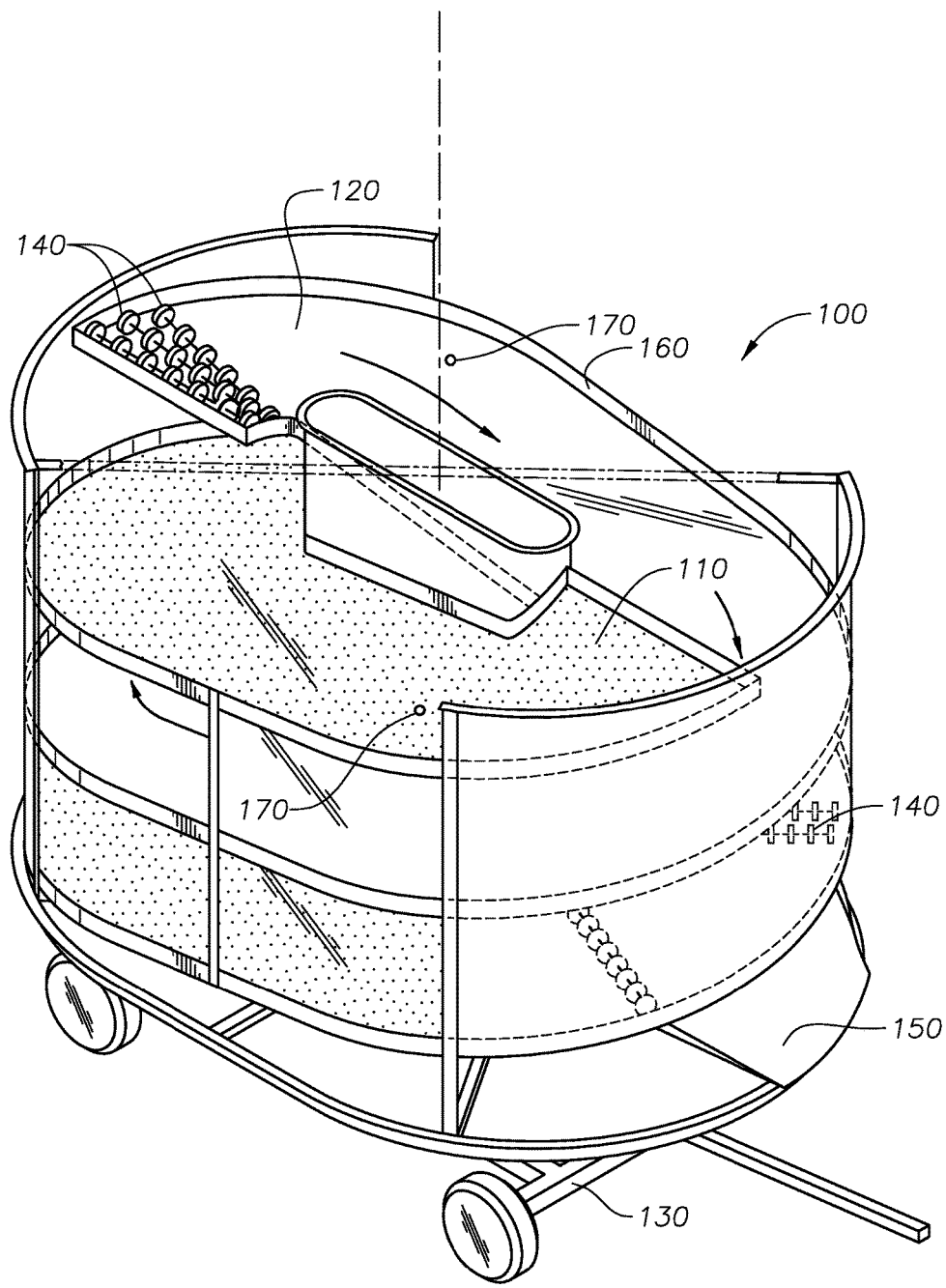
FIG. 1A illustrates a perspective view of a double helix baggage cart in accordance with implementations of various technologies described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

Executive Summary

The following paragraphs provide an executive summary of various technologies and techniques directed at a baggage cart and for using same to transport baggage throughout an airport's baggage network.

The baggage cart described herein may include two spiral chutes that may be intertwined with each other. Each chute may be angled such that when baggage is placed at the top of a chute, the baggage may slide down the chute towards the bottom of the baggage cart due to gravity. In one implementation, each chute may include transfer mechanisms at various points on the chute to ensure that the baggage slides down the chute automatically. At the bottom of each chute, the chute may fold at an angle such that the baggage at the bottom of the chute rests within the chute and does not fall off the chute onto the ground. The two spiral chutes may be coupled to a cart. Both the two spiral chutes and the cart may be coupled to or positioned next to a mobile bag loader. In one implementation, the two spiral chutes may rotate around a vertical axis located in the middle of the spiral chutes.

In operation, the baggage cart may be used to transport baggage throughout an airport's baggage network. In one implementation, in order to load baggage onto the baggage cart, the top of one chute in the baggage cart may be positioned adjacent to and below a conveyor belt on a mobile bag loader. The conveyor belt on the mobile bag loader may be inclined such that the front end of the conveyor belt is adjacent to and above the top portion of the chute and the back end of the conveyor belt may be positioned near the ground. Baggage may then be placed on the back end of the conveyor belt such that the baggage may travel upward on the conveyor belt and fall onto the top portion of the chute. In order to prevent the baggage from falling onto the ground from the chute, the bottom of the chute may be folded upward. As a piece of baggage is dropped onto the top of the chute, the piece of baggage may slide down the chute until it rests against the folded bottom portion of the chute or against another piece of luggage that may be resting against the folded portion of the chute.

In another implementation, in order to unload baggage from the baggage cart onto the mobile bag loader, the bottom of one chute on the baggage cart may be positioned adjacent to and above the back end of the conveyor belt on the mobile bag loader. In order to do this, the bottom of the chute may be folded downward such that it is adjacent to and above the back end of the conveyor belt. The conveyor belt on the mobile bag loader may be angled such that the front end of the conveyor belt may be positioned higher than the back end. Once the bottom portion of the chute is positioned adjacent to and above the back end of the conveyor belt, the conveyor belt may be rotated and the piece of baggage located at the bottom of the chute may fall into the back end of the conveyor belt and be picked up by the conveyor belt. The next piece of baggage leaning against the piece of baggage that was recently picked up may slide down toward the bottom of the chute and onto the conveyor belt. The process continues until each piece of baggage has slid down the bottom of the chute and onto the conveyor belt.

In yet another implementation, the baggage cart described herein may be implemented in an airport baggage system. A plurality of baggage carts described herein may be disposed underneath a conveyor belt in the airport baggage system. The airport baggage system may include a complex network of conveyor belts that may be positioned high above the ground such that the baggage carts may fit underneath the conveyor belts. The airport baggage system may use a first scanner to scan each piece of baggage and determine the flight information for the corresponding piece of baggage. After scanning the baggage, the airport baggage system may determine which conveyor belt within the network of conveyor belts corresponds to the scanned baggage's flight information. The airport baggage system may then use plows or pushers that are positioned above the conveyor belts to push the scanned baggage onto various conveyor belts in the network of belts such that the scanned baggage may eventually be placed on the conveyor belt that corresponds to the scanned baggage's flight information.

After the scanned baggage is placed on the conveyor belt that corresponds to the scanned baggage's flight information, the airport baggage system may use a second scanner to determine which baggage cart of the number of baggage carts disposed underneath the conveyor belt corresponds to the flight information for the scanned baggage. After determining which baggage cart corresponds to the flight information for the scanned baggage, the airport baggage system may use a plow or pusher to push the scanned baggage onto the top of one chute of the baggage cart that corresponds to the flight information for the scanned baggage.

Various implementations of the baggage cart described herein and various techniques for using same to transport baggage throughout an airport baggage network will now be described in more detail with reference to FIGS. 1-7 and in the following paragraphs.

Double Helix Baggage Cart

FIG. 1A illustrates a perspective view of a baggage cart 100 in accordance with implementations of various technologies described herein. The baggage cart 100 may include a first chute 110, a second chute 120, a cart 130, transfer mechanisms 140, a ramp 150, edging 160 and sensor 170. First chute 110 and second chute 120 may be shaped as a vertical spiral and may be intertwined with each other. In one implementation, first chute 110 and second chute 120 may be intertwined such that the two chutes form a double helix shape. The vertical distance between each chute may be large enough such that standard airline baggage may fit within each chute. Each chute may be configured to slope downward such that baggage placed on the top of the chute may slide down the chute due to gravity.

In one implementation, transfer mechanisms 140 may be added on the top of each chute such that baggage may start sliding down the chute more easily. Transfer mechanisms 140 may include rollers, ball transfers, skate wheels and the like. Transfer mechanisms 140 may be positioned at various points on each chute. In another implementation, transfer mechanisms 140 may be positioned continuously throughout each chute to help ensure that the baggage continues to fall down to the bottom of the chutes. Further, in yet another implementation, different kinds of transfer mechanisms 140 may be distributed at different points on each chute such that baggage may slide down each chute more effectively.

Edging 160 are disposed along the sides of each chute to keep the baggage inside the chute and prevent the baggage from falling off the side of the chute. At the bottom of each chute, a portion of the chute may fold or bend upwards and lock in place to prevent baggage from falling off the chute and onto the ground. This portion of the chute may be referred to as ramp 150. Although ramp 150 is used herein to prevent baggage from falling off each chute, it should be noted that in other implementations, other devices may be used to prevent baggage from falling off the chutes, such as a rubber stopper, a chain gate and the like.

The intertwined chutes may be coupled to cart 130. Cart 130 may include wheels such that it may be transported around an airport. In one implementation, the intertwined chutes may be coupled to the cart 130 such that it rotates about a vertical axis located in the middle of cart 130. Although baggage cart 100 has been described as having two chutes, it should be noted that in some implementations, baggage cart 100 may include one chute or more than two chutes intertwined with each other.

Figure 1B:
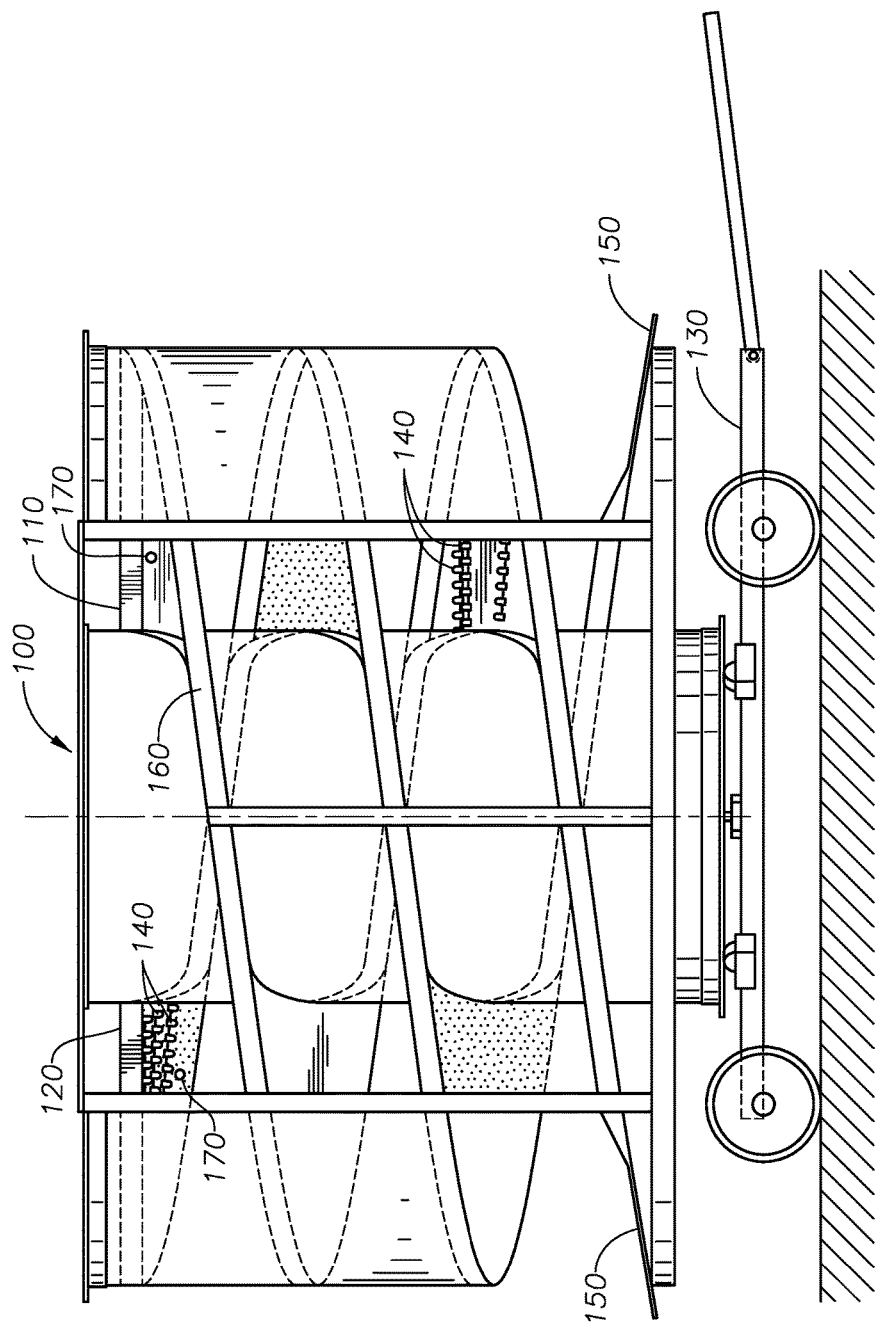
FIG. 1B illustrates a side view of a double helix baggage cart in accordance with implementations of various technologies described herein.

FIG. 1B illustrates a side view of the baggage cart 100 in accordance with implementations of various technologies described herein. As shown in FIG. 1B, the top and bottom ends of chute 110 and chute 120 may be positioned on opposite ends of cart 130, i.e., at about 180 degrees apart. In one implementation, the top ends of chute 110 and chute 120 may be disposed underneath an airport baggage system such that the baggage may be pushed onto either chute from a conveyor belt on the airport baggage system. A shaft may be disposed through the center of baggage cart 100 to enable the baggage cart 100 to rotate about the shaft. In one implementation, the shaft may be positioned on bearings such that it may be rotated along the bearings. The airport baggage system and its operation with the baggage cart will be described in more detail with reference to FIGS. 3A-3B.

System for Loading and Unloading Baggage

Figure 2A:
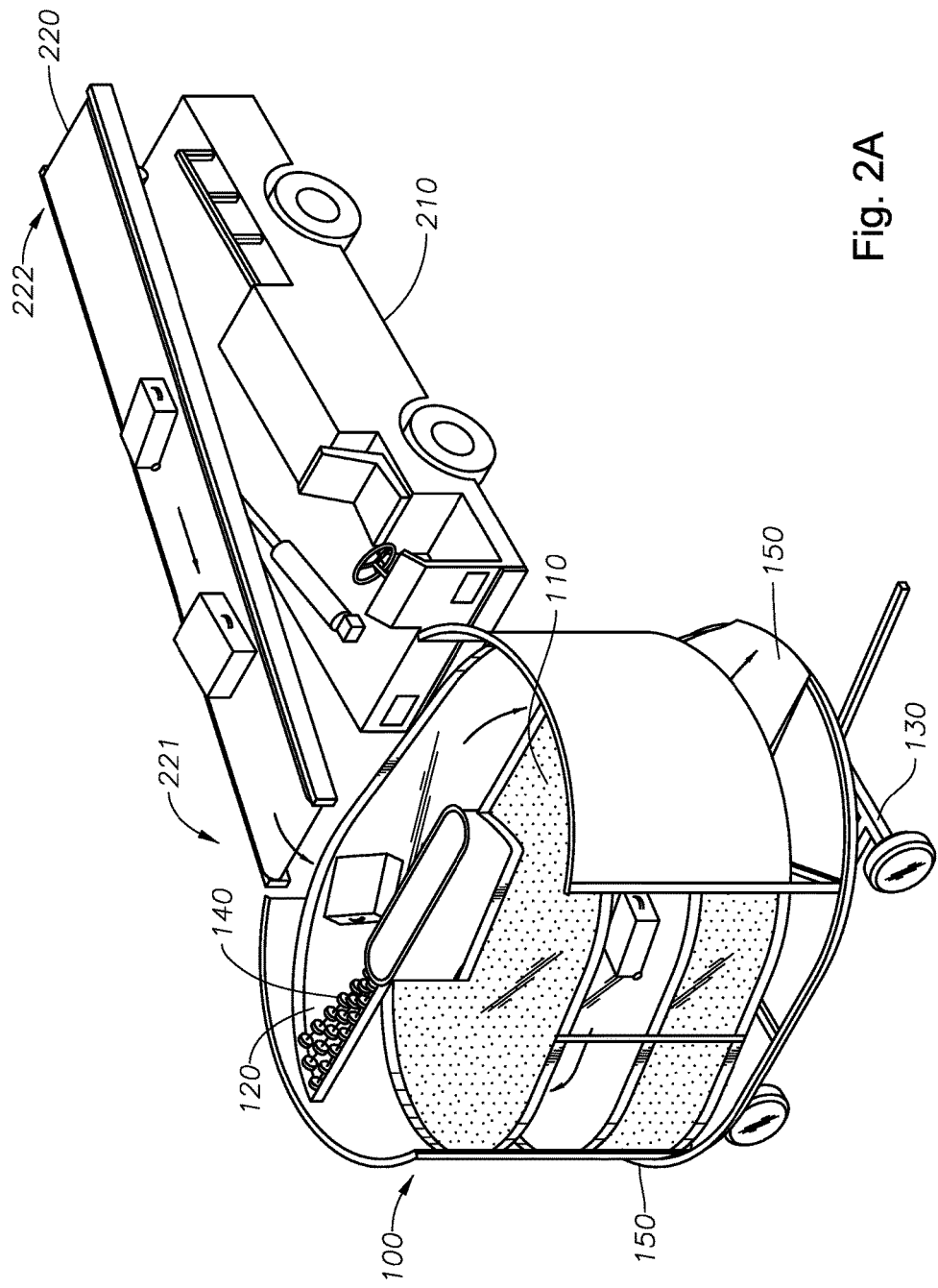
FIG. 2A illustrates a mobile bag loader loading baggage onto the double helix baggage cart in accordance with implementations of various technologies described herein.

FIG. 2A illustrates using a mobile bag loader 210 loading baggage onto a baggage cart 100 in accordance with implementations of various technologies described herein. The following description for FIG. 2A is made with reference to baggage cart 100 of FIGS. 1A-1B. Mobile bag loader 210 may also be referred to as belt loader, mobile baggage transporter, mobile conveyor belt and the like. As shown in FIG. 2A, baggage may be placed on belt 220 of mobile bag loader 210. Belt 220 may rotate such that baggage placed on belt 220 may travel from a back end 222 of belt 220 to a front end 221 of belt 220. The front end 221 of belt 220 may be positioned adjacent to and above the top of one chute (e.g., chute 120) of baggage cart 100. The back end 222 of belt 220 may be positioned closer to the ground such that baggage may be placed onto the back end 222 of belt 220 by an airport employee or using a baggage slide. The baggage slide will be described in greater detail with reference to FIG. 2C. As baggage is dropped onto chute 120 from belt 220, the baggage may slide down chute 120 to ramp 150.

FIG. 2B illustrates using the mobile bag loader 210 unloading baggage from the baggage cart 100 in accordance with implementations of various technologies described herein. The following description for FIG. 2B is made with reference to baggage cart 100 of FIGS. 1A-1B. For unloading baggage cart 100, the back end 222 of belt 220 may be positioned adjacent to and below ramp 150 of one chute (e.g., chute 120) of baggage cart 100 such that baggage may fall off ramp 150 and onto belt 220. Here, the back end 222 of belt 220 may be positioned closer to the ground such that when ramp 150 is folded down, baggage may slide onto the back end 222 of belt 220 from baggage cart 100. Initially, the bottom-most piece of baggage may rest on the back end 222 of belt 220 after ramp 150 is folded down. Belt 220 may be angled such that the front end 221 of belt 220 may be positioned high above the ground near an airport baggage system, airplane or the like. In one implementation, belt 220 may rotate such that the bottom-most piece of baggage resting on belt 220 may travel up towards the front end 221 of belt 220. As the bottom-most piece of baggage travels up belt 220, the piece of baggage that is resting against the bottom-most piece of baggage may slide down chute 120 and onto belt 220. In this manner, each piece of baggage on chute 120 may automatically be placed onto belt 220 without having airport employees lifting baggage, thereby transferring baggage from baggage cart 100 to mobile bag loader 210 more efficiently.

Figure 2C:
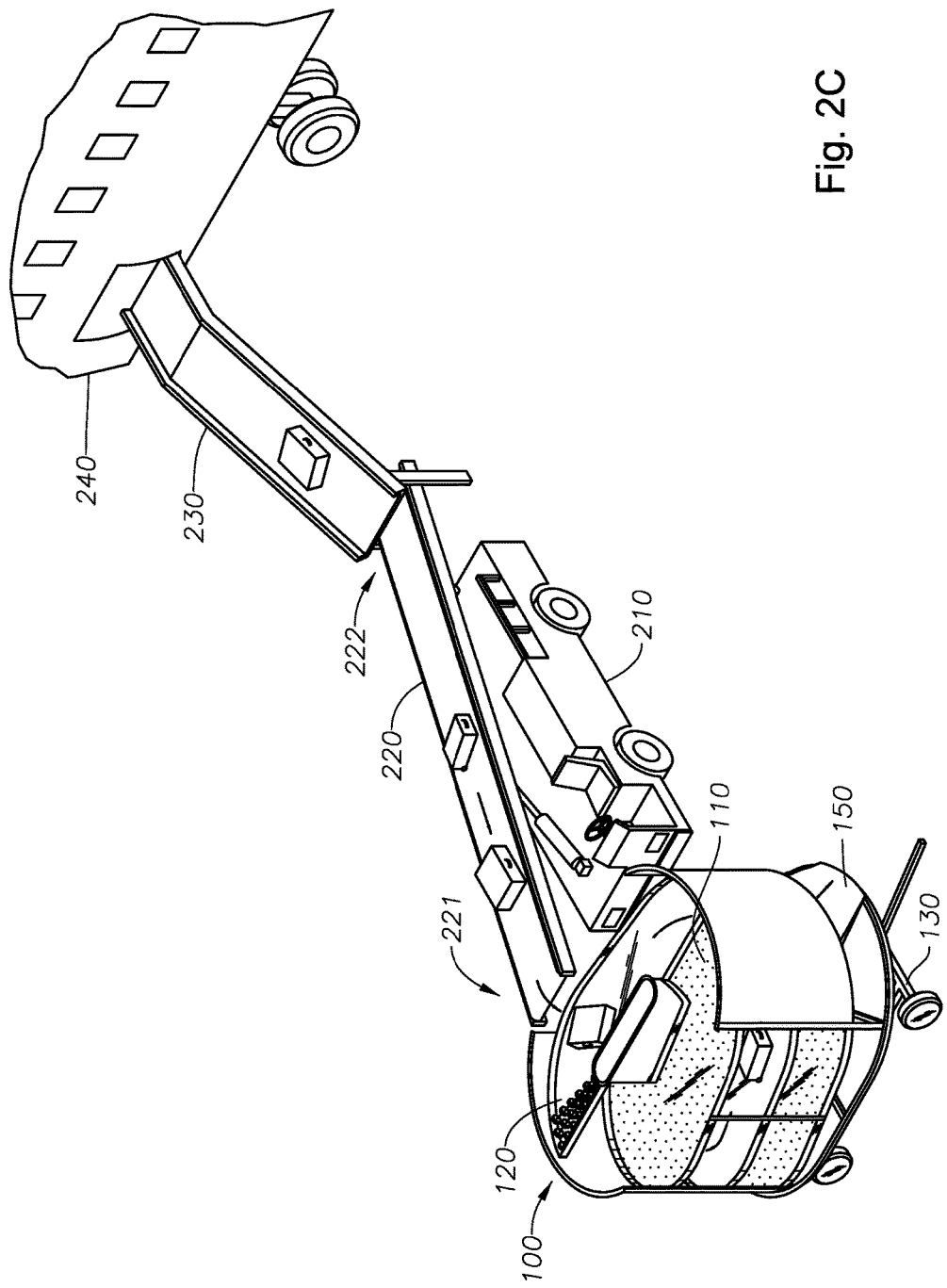
FIG. 2C illustrates a baggage slide coupled to a mobile bag loader for loading baggage onto a baggage cart in accordance with implementations of various technologies described herein.

FIG. 2C illustrates a baggage slide 230 coupled to the mobile bag loader 210 for loading baggage onto the baggage cart 100 in accordance with implementations of various technologies described herein. The following description for FIG. 2C is made with reference to baggage cart 100 of FIGS. 1A-1B. Baggage slide 230 may be configured such that a first end of baggage slide 230 may be coupled to a baggage compartment door of an aircraft and a second end of baggage slide may be coupled to the back end 222 of belt 220 on mobile bag loader 210. In one implementation, slide 230 may be composed of carbon fibers or other light weight materials that would support baggage sliding down baggage slide 230 from an aircraft's baggage compartment door. In operation, baggage may be placed on the first end of baggage slide 230 and may subsequently slide down baggage slide 230 and onto the back end 222 of belt 220. Once a piece of baggage falls onto belt 220, belt 220 may rotate and lift the piece of baggage up and drop the piece of baggage onto baggage cart 100 as described in FIG. 2A.

In another implementation, the second end of baggage slide 230 may be coupled to or positioned adjacent to and above the top of a chute in baggage cart 100. In this manner, baggage may be placed on the first end of baggage slide 230 and subsequently slide down to the second end of baggage slide 230 and onto a chute on baggage cart 100. Once a piece of baggage falls onto a chute of baggage cart 100, the piece of baggage may travel down the chute as described in FIG. 2A.

Double Helix Baggage Cart System

Figure 3A:
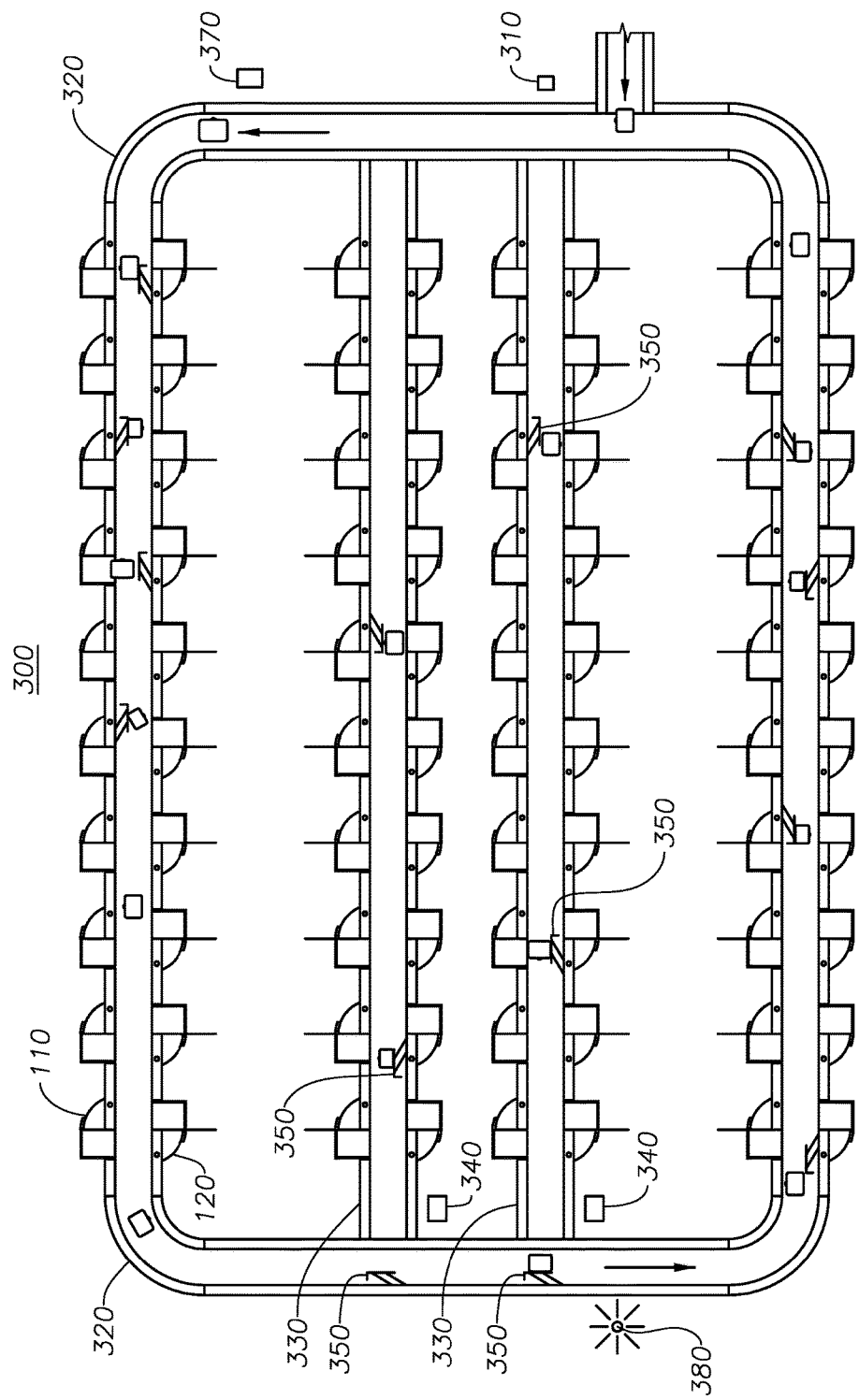
FIG. 3A illustrates an airport baggage system using a plurality of double helix baggage carts in accordance with implementations of various technologies described herein.

FIG. 3A illustrates an airport baggage system 300 using multiple baggage carts in accordance with implementations of various technologies described herein. The following description for FIG. 3A is made with reference to baggage cart 100 of FIGS. 1A-1B. Airport baggage system 300 may include scanner 310, main belt 320, branch belts 330, scanner 340, pusher 350, controller 370 and alarm 380. In one implementation, airport baggage system 300 may be positioned high above the ground (e.g., 9 feet or higher) such that one or more baggage carts 100 may be disposed underneath main belt 320 and branch belts 330. Airport baggage system 300 may be connected to additional airport baggage systems located at various places in an airport. The airport baggage system may be connected together via additional belts between the additional airport baggage systems.

Scanner 310 and scanner 340 may be configured to scan a barcode placed on a piece of baggage to determine the flight information that corresponds to the piece of baggage. The flight information obtained from scanner 310 and scanner 340 may be forwarded to controller 370, which may use the flight information to determine which branch belt 330 and which baggage cart 100 corresponds to each piece of baggage. In one implementation, each baggage cart 100 disposed under branch belt 330 and main belt 320 is associated with a particular flight number and aircraft. Each branch belt 330 may include all of the baggage carts 100 that are associated with a particular range of flight numbers. In this manner, upon determining the flight number associated with a piece of baggage, controller 370 may determine a branch belt 330 that corresponds to the flight number of the piece of baggage. In one implementation, once a piece of baggage is placed on main belt 320, scanner 310 scans flight information from the piece of baggage and sends the information to controller 370. Controller 370 may then use this information to determine the particular branch belt 230 that corresponds to the flight number of the piece of baggage. After determining the branch belt 330, controller 370 may send a command to pushers 350 to push the piece of baggage from main belt 320 to the appropriate branch belt 330. It should be noted that in some implementations, plows may be used in place of pushers. Controller 370 will be described in more detail with reference to FIG. 7.

Although scanner 310 and scanner 340 have been described as being configured to scan barcodes, it should be understood that in some implementations the scanners described herein may be configured to scan other types of machine-readable representations of data, such as a radio-frequency identification devices and the like. Further, in addition to flight information, scanner 310 and scanner 340 may receive additional information pertaining to the baggage, such as whether the baggage is a premium bag, the owner of the bag, and the like.

Pushers 350 may be positioned above main belt 320 and branch belt 330 and may be configured to push baggage onto different belts (e.g., from main belt 320 to branch belt 330) or into a baggage cart 100. Additional details as to pushers 350 pushing baggage into baggage cart 100 are provided below with reference to FIG. 3B.

After the piece of baggage is pushed to the appropriate branch belt 330, scanner 340 may scan the piece of baggage and send the information related thereto to controller 370. Controller 370 may then determine which baggage cart 100 disposed under branch belt 330 corresponds to the flight information of the piece of baggage. After determining the baggage cart 100 that corresponds to the flight information of the piece of baggage, controller 370 may send a command to pusher 350 to push the piece of baggage into baggage cart 100 that corresponds to the flight information of the piece of baggage. In addition to identifying the baggage cart 100 that corresponds to the flight information of the piece of baggage, the information obtained from scanner 340 may be used to determine which chute of baggage cart 100 corresponds to the piece of baggage. As such, each chute of baggage cart 100 may be used to differentiate between two types of baggage that are associated with the same flight information.

For instance, some baggage may be designated as premium baggage while other baggage may be designated as regular baggage. Accordingly, one chute of baggage cart 100 may be designated to hold the premium baggage and the other chute of baggage cart 100 may be designated to hold the regular baggage. After determining whether a piece of baggage is a premium piece of baggage or a regular piece of baggage, controller 370 may send a command to pusher 350 to push the piece of baggage into its corresponding chute of baggage cart 100. In one implementation, premium baggage may be loaded onto an aircraft last and unloaded from the aircraft first such that they are received at the general baggage claim area in the airport first.

Figure 3B:
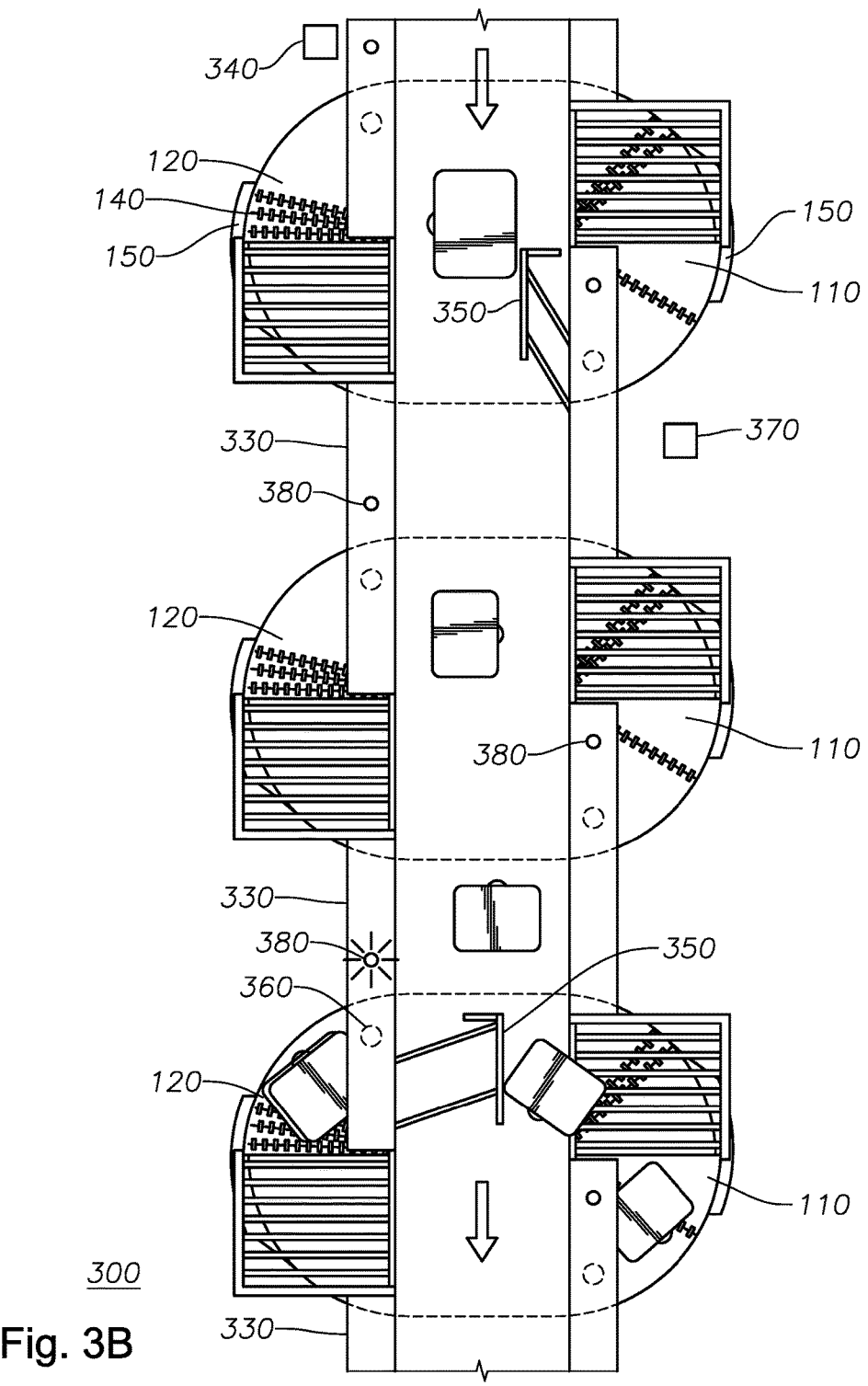
FIG. 3B illustrates a branch belt in an airport baggage system using a plurality of double helix baggage carts in accordance with implementations of various technologies described herein.

FIG. 3B illustrates the branch belt 330 in the airport baggage system 300 using multiple baggage carts in accordance with implementations of various technologies described herein. The following description for FIG. 3B is made with reference to baggage cart 100 of FIGS. 1A-1B and airport baggage system 300 of FIG. 3A. FIG. 3B includes branch belt 330, pusher 350, chute 110, chute 120, sensor 360 and controller 370. In one implementation, after controller 370 determines which baggage cart 100 and chute of baggage cart 100 correspond to the piece of baggage, controller 370 may determine when the piece of baggage may be in front of its corresponding baggage cart 100 and chute based on the rate at which the belt of branch belt 330 rotates. Once a piece of baggage reaches the corresponding baggage cart 100 and chute, pusher 350 may push the piece of baggage onto the appropriate chute. In one implementation, pusher 350 may push the piece of baggage onto an angled set of rollers such that the piece of baggage may fall into a chute of baggage cart 100. In another implementation, pusher 350 may push the piece of baggage directly onto a chute of baggage cart 100.

Sensor 360 may be used to determine whether a chute on baggage cart 100 is full and cannot fit any more baggage. In one implementation, sensor 360 may be coupled to branch belt 330 and may be pointed towards baggage cart 100. Sensor 360 may be configured to determine whether an object is in front of sensor 360 for more than a predetermined amount of time. In one implementation, sensor 360 may be a transmitting optical sensor (e.g., optical emitter/detector sensor) disposed on the underside of the branch belt 330, and sensor 170 may be a receiving optical sensor disposed on the top portion of a chute. The transmitting optical sensor 360 may coordinate with the receiving optical sensor 170 to determine whether an object is at the top of a chute for more than a predetermined amount of time. For example, the transmitting optical sensor 360 may emit an optical beam downward from the underside of the branch belt 330 to the receiving optical sensor 170 on the top of the chute. If a piece of baggage obstructs the optical beam between the transmitting optical sensor 360 and the receiving optical sensor 170 for a predetermined amount of time, the transmitting optical sensor 360 may send an alarm to controller 370 indicating that the baggage cart 100 corresponding to the receiving optical sensor 170 is full. After receiving the alarm, controller 370 may no longer push baggage onto the chute of baggage cart 100 corresponding to the receiving optical sensor 170.

In one implementation, after receiving the alarm notification, controller 370 may illuminate alarm 380. Alarm 380 may be a visual or audible alarm that illuminates or produces a siren when a chute is full. As shown in FIG. 3B, alarm 380 may be located near each respective chute location on the main belt 320 or the branch belt 330 to indicate which chute on baggage cart 100 is full. Additionally, alarm 380 may be located on or near the ground level of airport baggage system 300 such that airport employees may be alerted to a full chute on a baggage cart 100. (See FIG. 3A). Once sensors indicate that both chutes of a particular baggage cart 100 are full, the particular baggage cart 100 may be sent to its corresponding flight such that the baggage stored thereon may be loaded onto an aircraft as detailed in FIG. 2B. Although sensor 360 and sensor 170 have been described as optical sensors disposed on a chute and branch belt 330, it should be noted that in some implementations, sensor 360 and sensor 170 may be any type of sensor that may be used to determine whether a chute of baggage cart 100 is full, such as an infrared sensor, a weight sensor, a photo emitter/detector sensor, an ultrasonic emitter/detector sensor, vision sensor (e.g., camera) and the like. Further, although sensor 360 has been described as a transmitting optical sensor and sensor 170 has been described as a receiving sensor, it should be understood that in some implementations sensor 360 may be the receiving optical sensor and sensor 170 may be the transmitting optical sensor. Further, in some implementations, only one sensor (i.e., sensor 170 or sensor 360) may be used to determine whether a chute of baggage cart 100 is full.

In another implementation, sensor 170 is a receiving optical sensor on the top of the chute which may be a reflector, such as a mirror and the like, and sensor 360 is a transmitting optical sensor. In this manner, the transmitting optical sensor 360 may emit an optical beam downward from the underside of the branch belt 330 to the reflector (i.e., receiving optical sensor 170) on the top of the chute. The optical beam may then be reflected back to the transmitting optical sensor 360. If a piece of baggage obstructs the optical beam between the transmitting optical sensor 360 and the reflector (i.e., receiving optical sensor 170) for a predetermined amount of time, the transmitting optical sensor 360 may send a signal to controller 370 indicating that the chute of baggage cart 100 that corresponds to the reflector (i.e., receiving optical sensor 170) is full. In one implementation, baggage cart 100 may be rotated using baggage rotation devices until sensor 360 receives a reflected optical beam from a different reflector (i.e., receiving optical sensor 170) disposed on a different chute, at which point the baggage rotation devices may stop. The baggage rotation devices are described in more detail with reference to FIG. 4D.

In yet another implementation, sensor 360 and sensor 170 may be a photo emitter/detector sensor and a mirror, respectively. As such, the full condition of a chute may be sensed by the photo emitter/detector sensor when the reflected photo beam is blocked by baggage.

In yet another implementation, sensor 360 may be an ultrasonic emitter/detector, which may not require a reflector because it may emit sound waves that may be reflected off of the chute. When there are no bags on top of the chute, the sound waves may take longer to reflect back to the ultrasonic emitter/detector as compared to when there are bags on the top of the chute. As such, if the ultrasonic emitter/detector receives reflected sound waves within a predetermined amount of time, the ultrasonic emitter/detector may indicate that a bag is present on the top of the chute and that the chute is full.

In yet another implementation, sensor 360 may be a vision (camera/video) sensor. This type of sensor does not require a reflector as the video image is analyzed by software and compared to a reference video image of an empty chute. If the image does not match the reference image, the vision sensor signals that a bag is present in the image and that the chute is full.

Quadruple Helix Baggage Cart

Figure 4A:
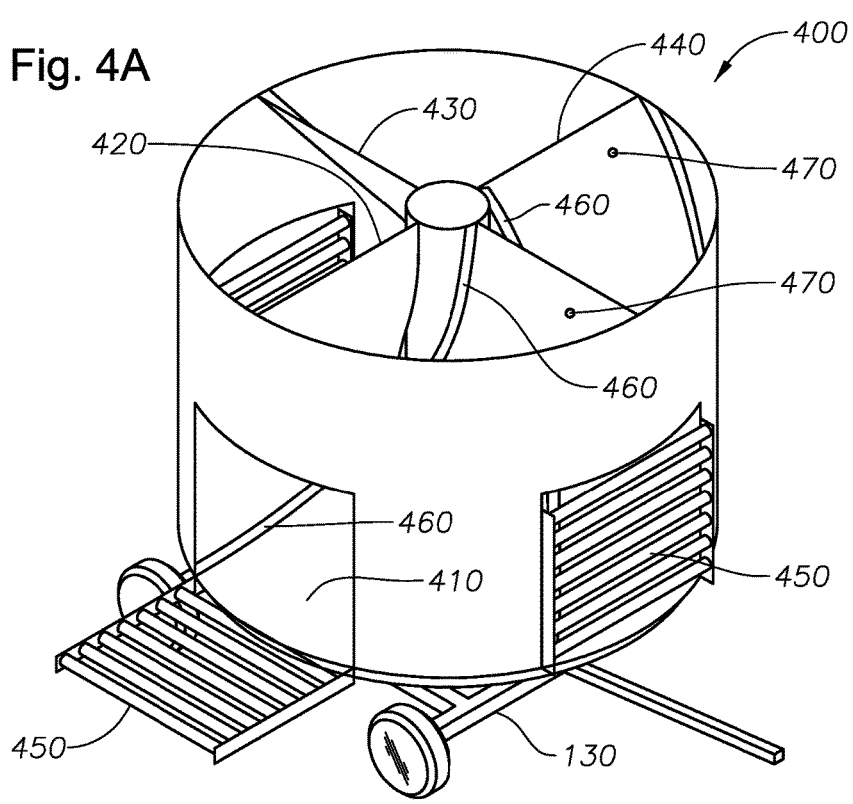
FIG. 4A illustrates a perspective view of a quadruple helix baggage cart in accordance with implementations of various technologies described herein.

FIG. 4A illustrates a perspective view of a quadruple helix baggage cart 400 in accordance with implementations of various technologies described herein. The following description of baggage cart 400 is made with reference to baggage cart 100 of FIGS. 1A-1B. The baggage cart 400 may include a first chute 410, a second chute 420, a third chute 430, a fourth chute 440, ramps 450, edging 460 and sensors 470. Ramps 450, edging 460 and sensors 470 may correspond to ramps 150, edging 160 and sensors 170 of FIG. 1. In one implementation, the quadruple helix chute system may be coupled to cart 130 and may rotate about a vertical axis located in the center of cart 130.

Like baggage cart 100, transfer mechanisms, such as rollers, ball transfers, skate wheels and the like, may be added on the top of each chute such that baggage may start sliding down the chute more easily. Transfer mechanisms may also be positioned at various points on each chute. In one implementation, the transfer mechanisms may be positioned continuously throughout each chute to help ensure that the baggage continues to fall down to the bottom of the chutes. In yet another implementation, different kinds of transfer mechanisms may be distributed at different points on each chute such that baggage may slide down each chute more effectively.

Edging 460 may be disposed along the sides of each chute to keep the baggage inside the chute and prevent the baggage from falling off the side of the chute. Ramp 450 may be disposed at the bottom of each chute to prevent baggage from falling off the chute and onto the ground. In an upward position, ramp 450 may be used to keep baggage inside the chute. In a downward position, ramp 450 may be used to facilitate transferring baggage out of the chute. In one implementation, ramp 450 may include transfer mechanisms to enable baggage to slide down ramp 450 more easily.

Figure 4B:
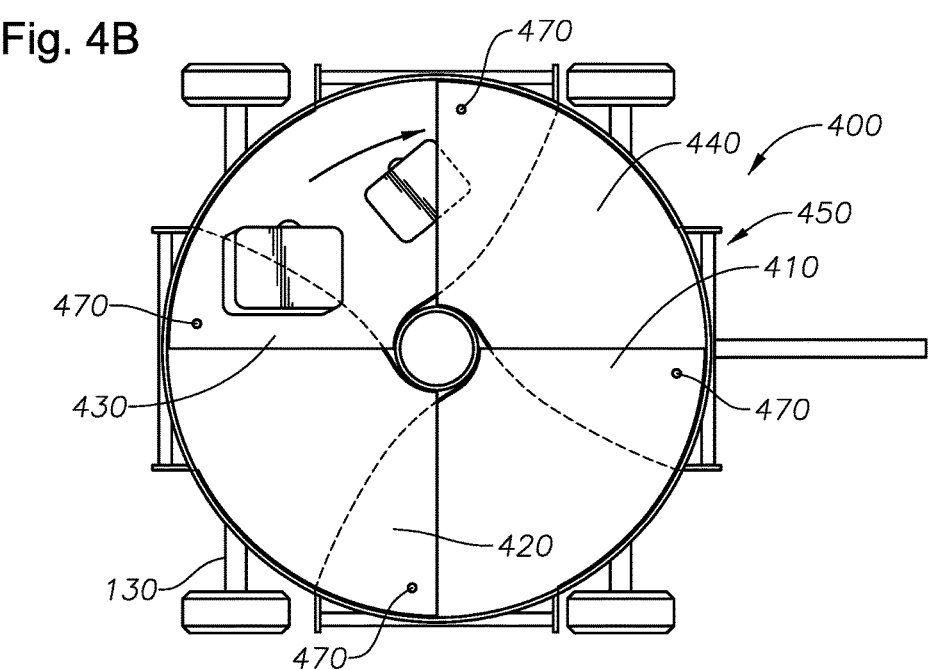
FIG. 4B illustrates a top view of a quadruple helix baggage cart in accordance with implementations of various technologies described herein.

FIG. 4B illustrates a top view of a quadruple helix baggage cart 400 in accordance with implementations of various technologies described herein. As shown in FIG. 4B, the top and bottom ends of chute 410 and chute 430 may be positioned on opposite ends of cart 400, i.e., at about 180 degrees apart, and the top and bottom ends of chute 420 and chute 440 may be positioned on opposite ends of cart 400, i.e., at about 180 degrees apart.

Also shown in FIG. 4B, each chute has sensor 470 disposed at the top of each chute. In one implementation, the functionalities and capabilities of sensor 470 correspond to the description of sensor 170 provided throughout this document (i.e., with respect to FIGS. 3B, 6 and 7). In this manner, sensor 470 may be used to determine whether a chute on baggage cart 100 is full and cannot fit any more baggage. Sensor 470 may send a signal to the controller 370 when a chute on baggage cart 400 is full.

In one implementation, sensor 360 of FIG. 3B may be used with sensor 470 to identify which chute on baggage cart 400 is currently positioned under branch belt 330 to receive baggage pushed by pusher 350. Sensor 360 may be a transmitting optical sensor disposed on the underside of the branch belt 330 as described above. Sensor 470 may be a reflector such as a mirror and the like. The reflector (i.e., sensor 470) may include data embedded therein that indicates the identity (e.g., identification number) of its corresponding chute. The transmitting optical sensor 360 may emit an optical beam downward from the underside of the branch belt 330 to the reflector (i.e., sensor 470) on the top of the chute. The optical beam may then be reflected back to the transmitting optical sensor 360. The reflection received by the transmitting optical sensor 360 may include the identity of the chute as listed on the reflector 170.

Figure 4C:
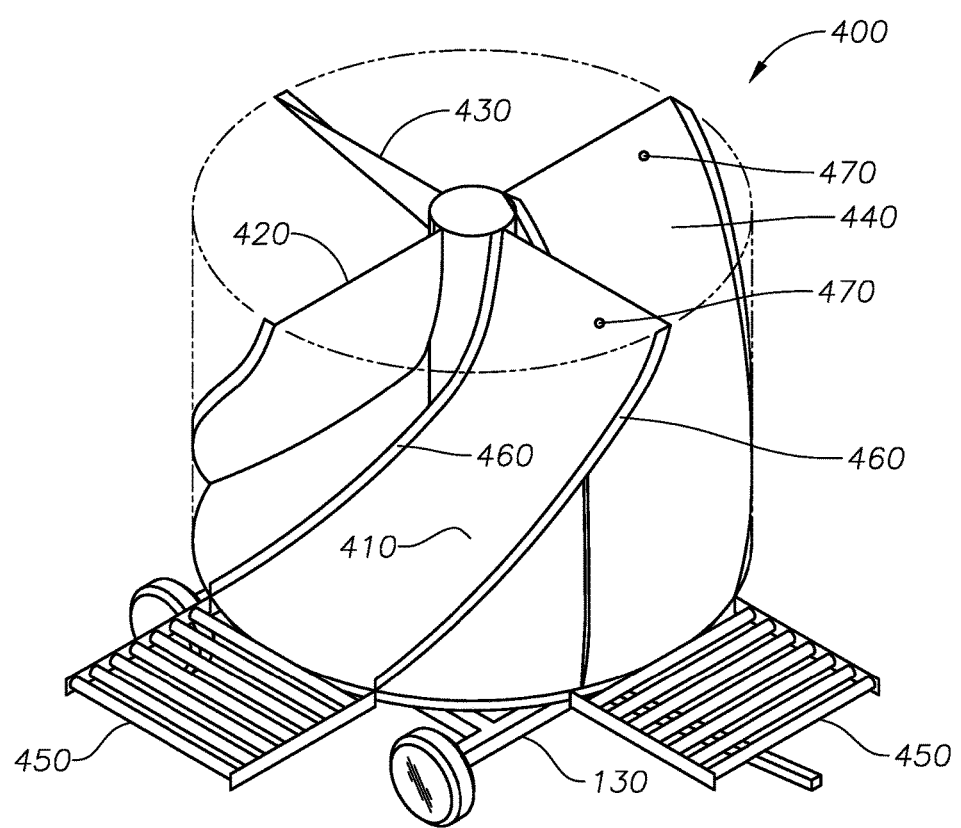
FIG. 4C illustrates an inner view of a quadruple helix baggage cart in accordance with implementations of various technologies described herein.

FIG. 4C illustrates an inner view of a quadruple helix baggage cart in accordance with implementations of various technologies described herein. Each chute may start at the top of baggage cart 400 and end towards the bottom of baggage cart 400. Each chute in baggage cart 400 may be configured to support the weight of standard airline baggage. The distance between each chute (e.g., chute 410 and chute 420) may be large enough such that standard airline baggage may fit within each chute. Each chute may slope downward such that baggage placed on the top of the chute may slide down the chute due to gravity and onto ramp 450.

Quadruple Helix Baggage Cart System

Figure 4D:
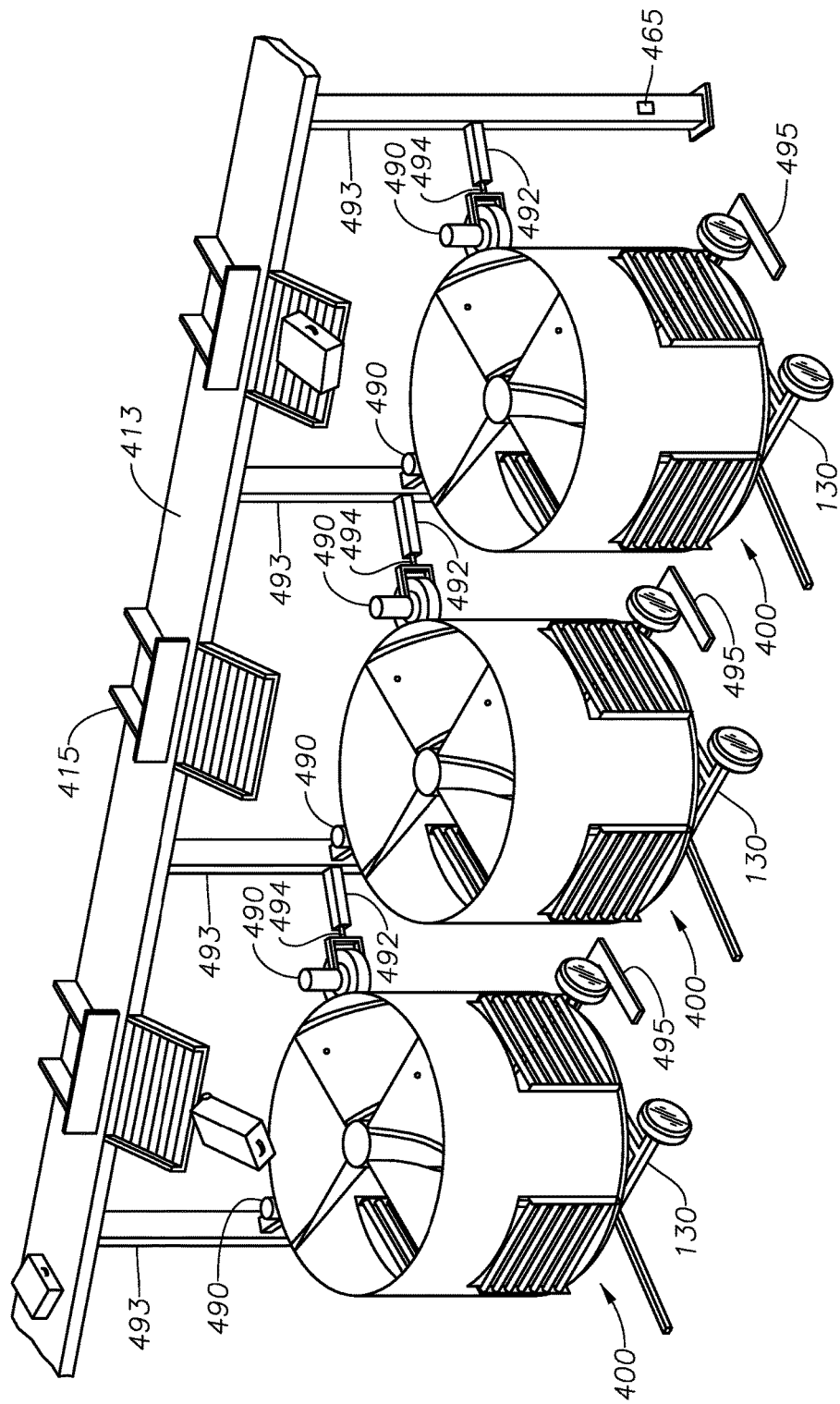
FIG. 4D illustrates a perspective view of a branch belt in an airport baggage system using a plurality of quadruple helix baggage carts in accordance with implementations of various technologies described herein.

FIG. 4D illustrates a perspective view of a branch belt in an airport baggage system using a plurality of quadruple helix baggage carts in accordance with implementations of various technologies described herein. The following description for FIG. 4D is made with reference to baggage cart 100 of FIGS. 1A-1B and airport baggage system 300 of FIGS. 3A-3B. FIG. 4D illustrates branch belt 413, pusher 415, quadruple helix baggage carts 400, position sensors 465, baggage cart rotation devices 490 and cart guide stops 495. Position sensors 465 may be used to determine which chute of baggage cart 400 is positioned adjacent to pusher 415 such that baggage may be pushed from branch belt 413 into the chute. Position sensors 465 may be any type of sensor as described above for sensor 360 such as an optical sensor, an infrared sensor and the like. Position sensors 465 are configured to read position information from a reflector 468 (shown on FIG. 4F) located on baggage cart 400. Position sensors 465 and reflectors 468 will be described in greater detail with reference to FIG. 4F below.

Baggage cart rotation devices 490 may be used to rotate baggage cart 400 around a vertical axis that travels through the center of baggage cart 400. More specifically, baggage cart rotation devices 490 are configured to rotate baggage cart 400 to position different chutes of baggage cart 400 under pusher 413. Each baggage cart rotation device 490 may be coupled to post 493 that supports branch belt 413 and may include a wheel configured to be positioned against an outer wall of baggage cart 400. In this manner, when rotation devices 490 rotate its wheels, baggage cart 400 rotates about its vertical axis. In one implementation, baggage cart 400 may include a center spindle. In this case, baggage cart rotation devices 490 may be positioned against an outer wall of the center spindle. By rotating baggage cart rotation devices 490 against the outer wall of the center spindle, the center spindle may cause the baggage cart 400 to rotate.

Cart guide stops 495 may be used as a place holder such that the wheels of cart 130 may fit within the corners of cart guide stops 495. In one implementation, cart guide stops 495 may indicate target baggage cart locations. Cart guide stops 495 may be attached to the floor and positioned underneath branch belt 413 such that pusher 415 is aligned above baggage cart 400 and in position to push baggage onto one of the chutes of baggage cart 400. After baggage cart 400 is positioned inside cart guide stops 495, a user may send a signal to controller 370 indicating the baggage cart 400 is ready to receive baggage. Although cart guide stops 495 have been described in connection with a quadruple helix baggage cart 400, it should be understood that cart guide stops 495 may also be used with a baggage cart having any number of chutes.

In one implementation, each baggage cart rotation device 490 may include a shock-like device 494 that may be compressed when baggage cart 400 is pushed against the baggage cart rotation device 490. The shock-like device 494 may be spring loaded such that they may be compressed. A proximity sensor 492 may be coupled to the shock-like device 494 to sense the position of baggage cart 400 with respect to the baggage rotation device 490. For instance, as baggage cart 400 approaches the final position inside cart guide stops 495, the shock-like device 494 may be compressed because baggage cart 400 may push into the baggage rotation device 490. The compression of the shock-like device 494 may activate the proximity sensor 492 to indicate that baggage cart 400 is in position to receive baggage. In one implementation, two proximity sensors 492 need to be activated in order to indicate that baggage cart 400 is in position to receive baggage.

FIG. 4E illustrates a side view of a branch belt in an airport baggage system using a plurality of quadruple helix baggage carts in accordance with implementations of various technologies described herein. The following description for FIG. 4E is made with reference to baggage cart 100 of FIGS. 1A-1B, airport baggage system 300 of FIGS. 3A-3B and quadruple helix baggage cart 400 of FIGS. 4A-4D. As shown in FIG. 4E, each baggage cart 400 may use two rotation devices 390 to rotate the baggage cart 400.

Figure 4F:
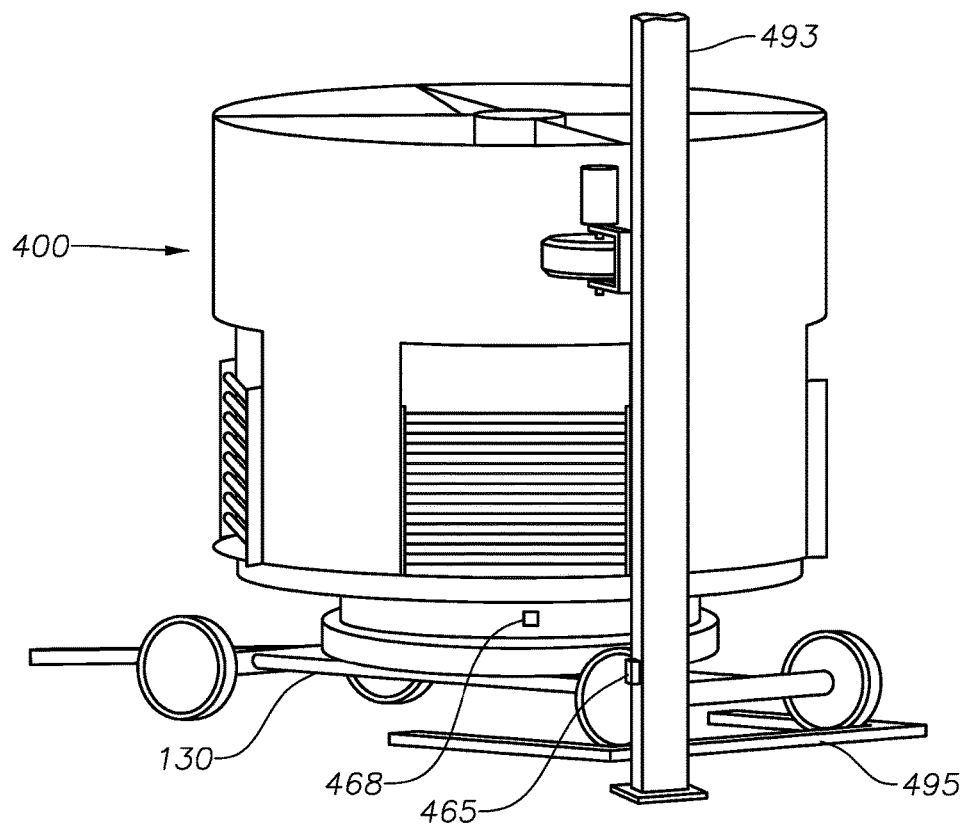
FIG. 4F illustrates a lower corner view of a branch belt in an airport baggage system using a plurality of quadruple helix baggage carts in accordance with implementations of various technologies described herein.

FIG. 4F illustrates a lower corner view of a branch belt in an airport baggage system using a plurality of quadruple helix baggage carts in accordance with implementations of various technologies described herein. The following description for FIG. 4F is made with reference to baggage cart 100 of FIGS. 1A-1B, airport baggage system 300 of FIGS. 3A-3B and quadruple helix baggage cart 400 of FIGS. 4A-4E. As shown in FIG. 4F, position sensor 465 may be positioned on a post 493 supporting belt 413 such that it is configured to be on the same line of sight as reflector 468, which is positioned on the outside of baggage cart 400. In one implementation, reflector 468 may be a mirror that may include data embedded therein to indicate the identity (e.g., identification number) of the chute. As such, each chute on baggage cart 400 may have an individual reflector 468 associated with it. Reflector 468 may also include information identifying the baggage cart 400 (e.g., identification number). Reflector 468 may be positioned on the outside of baggage cart 400 or on the lower support frame of baggage cart 400 such that it rotates along the vertical axis of baggage cart 400 with its corresponding chute.

When position sensor 465 is in the line of sight, or in line, with reflector 468, the chute of baggage cart 400 that corresponds to reflector 468 is positioned under a belt (e.g., branch belt 413) ready to receive baggage pushed by a pusher (e.g., pusher 413). In one implementation, position sensor 465 may emit an optical beam outward from post 493 to reflector 468. Since position sensor 465 is in line with reflector 468, the optical beam may then be reflected back to position sensor 465 by reflector 468. The reflection received by position sensor 465 may include the identity of the chute as listed on reflector 468.

Although cart guide stops 495, baggage rotation devices 490, proximity sensors 492, position sensor 465 and reflector 468 have been described in connection with baggage cart 400, in other implementations cart guide stops 495, baggage rotation devices 490, proximity sensors 492, position sensor 465 and reflector 468 may be used with any type of baggage cart and system described in FIGS. 1-3B.

Methodology for Loading and Unloading Baggage

FIG. 5 illustrates a flow diagram of a method 500 for transporting baggage using a baggage cart according to one or more implementations of various techniques described herein. Although the following description of method 500 is made with reference to baggage cart 100 of FIGS. 1A-1B, FIGS. 2A-2C, and airport baggage system 300 of FIGS. 3A-3B, it should be understood that in some implementations method 500 may be performed using baggage cart 400 of FIGS. 4A-4C.

At step 510, baggage cart 100 may be positioned adjacent to belt 220 of mobile bag loader 210. If baggage cart 100 is being loaded, the front end 221 of belt 220 may be positioned adjacent to and above the top of chute 110 or chute 120 and ramp 150 may be folded up. (See FIG. 2C). Baggage may then be added to the back end 222 of belt 220, which may be located closer to the ground. In one implementation, the back end 222 of belt 220 may be coupled to the end of baggage slide 230 such that baggage may be automatically placed on belt 220 from baggage slide 230.

At step 520, belt 220 may be rotated such that baggage placed on the back end 222 of belt 220 may be transported to the front end 221 of belt 220 and onto chute 110 or chute 120, whichever is disposed below belt 220. After a piece of baggage falls onto the chute adjacent to belt 220, the baggage may slide down the chute until it rests against ramp 150 or another piece of baggage. In one implementation, after the chute adjacent to belt 220 is full of baggage, baggage cart 100 may be rotated such that a different chute may be positioned adjacent to belt 220 as described above, and method 500 may be repeated for the different chute.

If baggage cart 100 is being unloaded, the back end 222 of belt 220 may be positioned adjacent to and below the bottom of a chute and ramp 150 may be folded down. (See FIG. 2B). After folding ramp 150 down, baggage may slide onto the back end 222 of belt 220 from the chute due to gravity. Although baggage cart 100 is described as being positioned adjacent to belt 220, it should be noted that in other implementations, the back end 222 of belt 220 may be coupled to the bottom of a chute such that baggage slides onto the back end 222 of belt 220. In one implementation, after the chute adjacent to belt 220 has emptied its baggage onto belt 220, baggage cart 100 may be rotated such that a different chute may be positioned adjacent to belt 220 and the ramp 150 on the different chute may be folded down. As such, the baggage disposed on the different chute may be emptied onto belt 220.

Belt 220 may then be rotated such that baggage on the back end 222 of belt 220 may be transported to the front end 221 of belt 220. In one implementation, the front end 221 of belt 220 may be positioned adjacent to the baggage compartment of an aircraft or to a belt on airport baggage system 300 which may be located high above the ground. As a piece of baggage is carried from the back end 222 of belt 220, the bottommost piece of baggage on the chute that is positioned above the back end 222 of belt 220 may fall onto the back end 222 of belt 220 and may then be carried to the front end 221 of belt 220. The process continues until all the baggage on a chute has been transported to the front end 221 of belt 220.

Distributing Baggage with Helix Baggage Cart System

Figure 6:
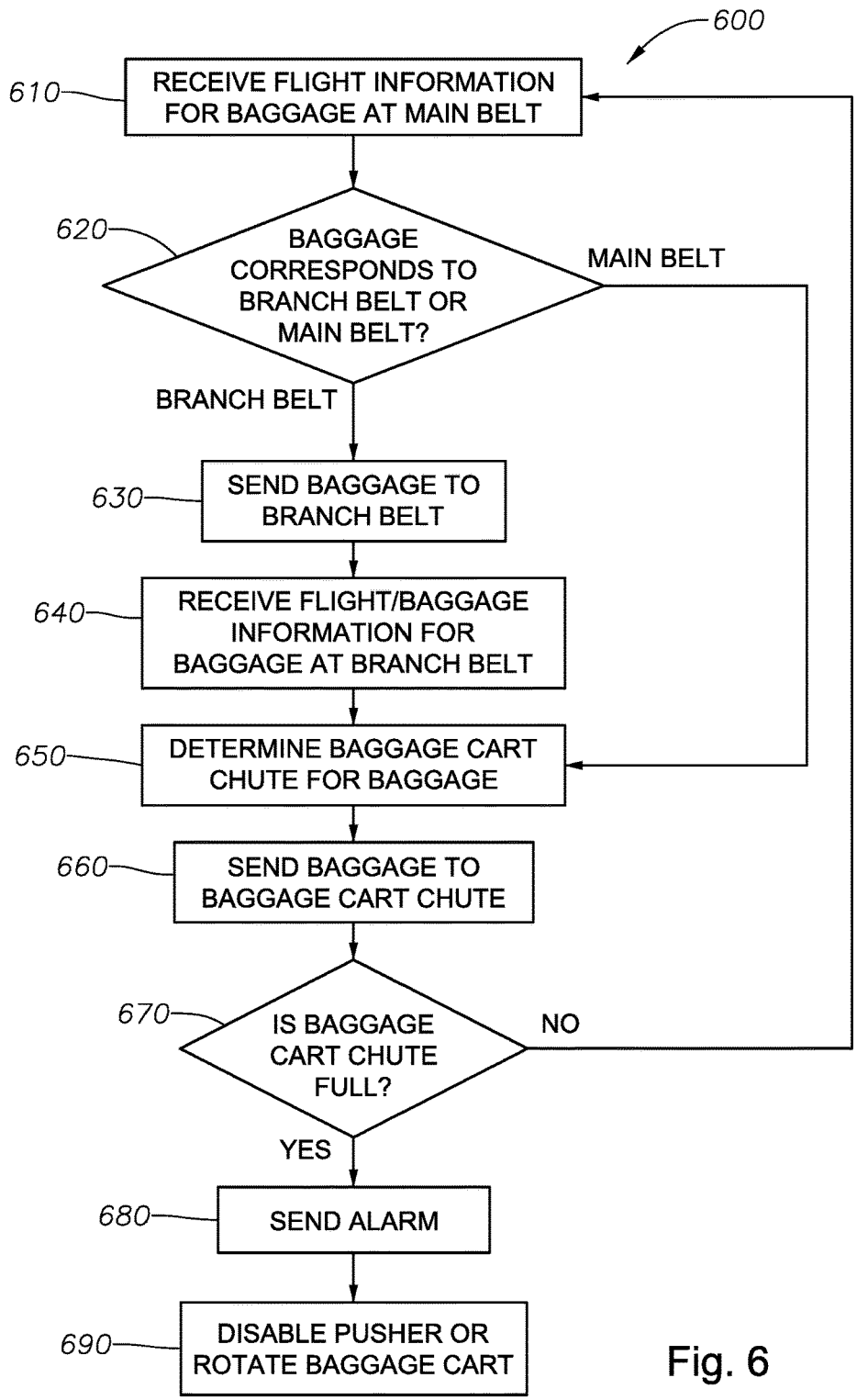
FIG. 6 illustrates a flow diagram of a method for distributing baggage in an airport baggage system having a plurality of double helix baggage carts in accordance with one or more implementations of various techniques described herein.

FIG. 6 illustrates a flow diagram of a method for distributing baggage in an airport baggage system having multiple baggage carts according to one or more implementations of various techniques described herein. Although the following description of method 600 is made with reference to baggage cart 100 of FIGS. 1A-1B and airport baggage system 300 of FIGS. 3A-3B, it should be understood that method 600 may also be performed using baggage cart 400 of FIGS. 4A-4C. It should further be understood that while the flow diagram 600 indicates a particular order of execution of the operations, in some implementations, certain portions of the operations might be executed in a different order. In one implementation, method 600 may be performed by controller 370.

At step 610, controller 370 may receive flight information from scanner 310 after scanner 310 scans a piece of baggage. The flight information may indicate the flight number that corresponds to the scanned piece of baggage. In one implementation, scanner 310 may scan each piece of baggage before it is placed on main belt 320. Scanner 310 may scan a tag placed on each piece of baggage, a radio-frequency identification device placed on each piece of baggage, or other type media placed on each piece of baggage. After scanning the piece of baggage, scanner 310 may send the flight information associated with the scanned piece of baggage to controller 370.

In one implementation, controller 370 may not receive flight information from scanner 310 for a piece of baggage due to an object obstructing scanner 310's view of the baggage's tag. In this case, the piece of baggage may be diverted to a manual encoding position. At the manual encoding position, an airport employee may read the baggage's tag and manually input the flight information into controller 370. Controller 370 may then proceed to step 620.

At step 620, controller 370 may determine whether a branch belt 330 or main belt 320 corresponds to the flight information received at step 610. In one implementation, each branch belt 330 and main belt 320 may be associated with a particular range of flight numbers. As such, controller 370 may identify which range of flight numbers corresponds to the flight information received at step 610. Controller 370 may then determine whether the range of flight numbers corresponds to main belt 320 or a branch belt 330.

Steps 630-640 describe how baggage may be transferred to branch belts 330. If, however, the range of flight numbers corresponds to main belt 320, then controller 370 may skip steps 630-640 and proceed to step 650. At step 650, controller 370 may use the flight information that corresponds to the piece of baggage to determine which baggage cart 100 disposed under main belt 320 corresponds to the flight information received at step 610. In addition to determining the baggage cart 100 that corresponds to the flight information, controller 370 may determine which chute on baggage cart 100 corresponds to the information that specifically pertains to the piece of baggage, such as whether the piece of baggage is a premium bag. After determining which chute on baggage cart 100 corresponds to the information that pertains to the piece of baggage, controller 370 may proceed to step 660.

If the range of flight numbers corresponds to branch belt 330, controller 370 may proceed to step 630. At step 630, controller 370 may send the scanned piece of baggage to the branch belt 330 determined at step 620. In one implementation, in order to send the scanned piece of baggage to branch belt 330, controller 370 may determine the time at which the scanned piece of baggage may be in front of the appropriate branch belt 330 based on the rate at which main belt 320 rotates. Controller 370 may then send a command to a pusher 350 that is located on main belt 320 to push the scanned piece of baggage onto branch belt 330. Pusher 350 may be located where main belt 320 intersects the particular branch belt 330 determined at step 620. The command sent to pusher 350 may indicate the time at which the piece of baggage may be in front of the appropriate branch belt 330 as described above. Pusher 350 may then push the scanned piece of baggage onto branch belt 330 at the time at which the scanned piece of baggage may be in front of the appropriate branch belt 330.

At step 640, after the piece of baggage is pushed onto branch belt 330, controller 370 may receive the flight information that corresponds to the piece of baggage from scanner 340. In one implementation, controller 370 may already have this information from scanner 310 at step 610. As such, step 640 would be skipped. Additionally, controller 370 may also receive information that specifically pertains to the piece of baggage pushed onto branch belt 330. For example, controller 370 may receive information indicating that the scanned piece of baggage is a premium bag.

At step 650, controller 370 may determine which baggage cart 100 disposed under branch belt 330 corresponds to the flight information received at step 640. In addition to determining the baggage cart 100 that corresponds to the flight information, controller 370 may determine which chute on baggage cart 100 corresponds to the information that specifically pertains to the piece of baggage, such as whether the piece of baggage is a premium bag.

At step 660, controller 370 may send the scanned piece of baggage to the baggage cart 100 determined at step 650. Controller 370 may also send the scanned piece of baggage to the appropriate chute on baggage cart 100. In one implementation, in order to send the scanned piece of baggage to the appropriate chute on baggage cart 100, controller 370 may determine the time at which the scanned piece of baggage may be in front of the appropriate chute based on the rate at which branch belt 330 rotates. Controller 370 may then send a command to the pusher 350 that is located on branch belt 330 to push the scanned piece of baggage onto the appropriate chute. Pusher 350 may be located where branch belt 330 intersects the appropriate chute determined at step 650. In one implementation, the command sent to pusher 350 may indicate the time at which the piece of baggage may be in front of the appropriate chute on baggage cart 100. Accordingly, pusher 350 may push the scanned piece of baggage onto the appropriate chute at the time at which the scanned piece of baggage is in front of the appropriate chute.

In another implementation, before pusher 350 pushes the scanned piece of baggage onto the appropriate chute, controller 370 may use information acquired from one of the scanners to determine whether the piece of baggage is premium baggage or regular baggage. One or more chutes of baggage 100 cart may be designated to hold the premium baggage, while the other chutes of baggage cart 100 may be designated to hold the regular baggage. Controller 370 may be programmed to know which chutes of baggage cart 400 correspond to premium baggage and which chutes of baggage cart 400 correspond to regular baggage. After determining whether a piece of baggage is a premium piece of baggage or a regular piece of baggage, controller 370 may send a command to rotation devices 490 to rotate baggage cart 100 such that the appropriate chute is positioned adjacent to pusher 350. In one implementation, controller 370 may rotate baggage cart 100 until sensor 465 is aligned with reflector 468 that corresponds to the appropriate chute.

At step 670, controller 370 may determine whether any chute on any baggage cart 100 is full. In one implementation, sensor 360 may send a signal to controller 370 when a chute on baggage cart 100 is full. If controller 370 receives the signal from sensor 360, controller 370 may determine that the chute where sensor 360 is located is full and may proceed to step 680. If controller 370 does not receive the signal from sensor 360, controller 370 may determine that the chute where sensor 360 is located is not full and may return to step 610.

At step 680, controller 370 may activate alarm 380 to indicate that the chute is full. In one implementation, controller 370 may illuminate or sound alarm 380 to indicate to airport employees that the baggage cart chute is full. Each baggage cart may have its corresponding alarm.

At step 690, controller 370 may disable the pusher 350 associated with the full baggage cart chute. As such, controller 370 may no longer send baggage to the full chute until the alarm has been turned off.

Alternatively, at step 690, controller 370 may rotate the baggage cart using rotation devices 490 such that the full chute is no longer underneath pusher 350. In one implementation, in order to determine that a chute on the baggage cart is full, controller 370 may determine whether an optical beam emitted by transmitting optical sensor 360 is being reflected by sensor 470 (e.g., reflector). If a piece of baggage obstructs the optical beam between the transmitting optical sensor 360 and the sensor 470 for a predetermined amount of time, controller 370 may determine that the chute that corresponds to sensor 470 is full. After determining that a chute in the baggage cart 100 is full, controller 370 may send a command to baggage cart rotation device 490 to rotate baggage cart 400 until optical sensor 360 receives a reflected optical beam from sensor 470. If baggage cart rotation device 490 continues to rotate for a predetermined amount of time without receiving a reflected optical beam from sensor 470, controller 370 may determine that each chute on the baggage cart is full.

In another implementation, controller 370 may determine whether a chute on the baggage cart is full using an ultrasonic emitter/detector sensor or a vision sensor as described above with reference to FIG. 3B. After determining that a chute in the baggage cart 100 is full using the ultrasonic emitter/detector sensor or the vision sensor, controller 370 may send a command to baggage cart rotation device 490 to rotate baggage cart 400 such that the next chute is positioned in front of ultrasonic emitter/detector sensor or the vision sensor. Controller 370 may then determine whether the next chute on the baggage cart is full using the ultrasonic emitter/detector sensor or the vision sensor. If the next chute is full, controller 370 may continue to send a command to baggage cart rotation device 490 to keep rotating baggage cart 400 to subsequent chutes until the ultrasonic emitter/detector sensor or the vision sensor identifies an empty chute. If the ultrasonic emitter/detector sensor or the vision sensor does not identify an empty chute within a predetermined amount of time, controller 370 may determine that each chute on the baggage cart is full.

In one implementation, controller 370 may read the position of the baggage cart 100 using sensor 465 and reflector 468 and store information that indicates which position (i.e., chute) of the baggage cart 100 is full. In this manner, controller 370 may more effectively coordinate how a piece of baggage may be placed on specific chutes in the baggage cart 100.

Controller for Helix Baggage Cart System

FIG. 7 illustrates a computer network 700 into which implementations of various technologies described herein may be implemented. The following description of computer network 700 is made with reference to airport baggage system 300 of FIG. 3A. In one implementation, various techniques for distributing baggage in an airport baggage system as described in FIG. 6 may be performed by the computer network 700. The computer network 700 may include a controller 710, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, high-performance clusters of computers, co-processing-based systems (GPUs, FPGAs) and the like. Controller 710 may correspond to controller 370 described above.

Controller 710 may be in communication with sensor 360, sensor 465, sensor 492, sensor 170, main belt 320, branch belt 330, branch belt 413, pusher 350, pusher 415, alarm 380, scanner 310, scanner 340, rotation device 490 and sensor 470. Communication media may embody computer readable instructions, data structures or other program modules. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, controller 710 may receive flight information pertaining to each piece of baggage from scanner 310 and scanner 340. Similarly, controller 710 may receive a signal from sensor 360 and/or sensor 170/470 indicating that a chute on baggage cart 100/400 is full. If a chute on baggage cart 400 is full, controller 710 may send commands to rotation device 390 to rotate baggage cart 400. Controller 710 may also send commands to main belt 320 and branch belt 330 to start and/or stop rotating their respective belts. Similarly, controller 710 may send a command to pusher 350 such that pusher 350 may push each piece of baggage onto a branch belt 330 or onto a chute on baggage cart 100 as described in method 600.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for unloading one or more bags, comprising:
positioning a back end of a conveyor belt on a mobile bag loader adjacent to and under a first chute of a baggage cart having at least two intertwined chutes;
folding down a ramp portion of the first chute toward the back end; and
rotating the conveyor belt.

2. The method of claim 1, further comprising:
folding up the ramp portion of the first chute;
rotating the at least two intertwined chutes so that the back end of the conveyor belt is positioned adjacent to and under a second chute of the baggage cart; and
folding down a ramp portion of the second chute toward the back end.

3. The method of claim 2, wherein the at least two intertwined chutes are rotated when the first chute is empty of baggage.

4. The method of claim 1, further comprising rotating the at least two intertwined chutes around a vertical axis located in a middle of the at least two intertwined chutes.

5. The method of claim 1, further comprising configuring the conveyor belt such that a first end of the conveyor belt is angled higher than a second end of the conveyor belt.

6. The method of claim 1, further comprising configuring the conveyor belt to pick up bags from the intertwined chutes of the baggage cart.

7. A method for loading one or more bags, comprising:
positioning a front end of a conveyor belt on a mobile bag loader adjacent to and above a first chute of a baggage cart having at least two intertwined chutes, the at least two intertwined chutes forming a double helix shape;

placing the bags on the conveyor belt; and rotating the conveyor belt.

8. The method of claim 7, wherein placing the bags on the conveyor belt comprises:

coupling a first end of a baggage slide to an aircraft;

coupling a second end of the baggage slide to a back end of the conveyor belt; and placing the bags on the first end of the baggage slide.

9. The method of claim 7, further comprising rotating the at least two intertwined chutes around a vertical axis located in a middle of the at least two intertwined chutes.

10. The method of claim 7, further comprising configuring the conveyor belt such that a first end of the conveyor belt is angled higher than a second end of the conveyor belt.

11. The method of claim 7, further comprising configuring the conveyor belt to drop bags onto the intertwined chutes of the baggage cart.

12. The method of claim 8, wherein the baggage slide comprises a carbon fiber baggage slide.

13. A method for loading one or more bags, comprising:

positioning a front end of a conveyor belt on a mobile bag loader adjacent to and above a first chute of a baggage cart having at least two intertwined chutes;

placing the bags on the conveyor belt;

rotating the conveyor belt; and rotating the at least two intertwined chutes such that the front end of the conveyor belt is positioned adjacent to and above a second chute of the baggage cart.

14. The method of claim 13, wherein the at least two intertwined chutes are rotated when the first chute is full of baggage.

* * * * *